(12) United States Patent
He et al.

(10) Patent No.: US 9,088,977 B2
(45) Date of Patent: Jul. 21, 2015

(54) HYBRID AUTOMATIC REPEAT REQUEST (HARQ) MAPPING FOR CARRIER AGGREGATION (CA)

(71) Applicant: Intel Corporation, Santa Clara, CA (US)

(72) Inventors: Hong He, Beijing (CN); Jong-Kae Fwu, Sunnyvale, CA (US); Debdeep Chatterjee, Santa Clara, CA (US); Rui Huang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 190 days.

(21) Appl. No.: 13/853,390

(22) Filed: Mar. 29, 2013

(65) Prior Publication Data

US 2013/0322357 A1    Dec. 5, 2013

Related U.S. Application Data

(60) Provisional application No. 61/667,325, filed on Jul. 2, 2012, provisional application No. 61/653,369, filed on May 30, 2012.

(51) Int. Cl.
| | |
|---|---|
| H04W 4/00 | (2009.01) |
| H04W 72/04 | (2009.01) |
| H04L 12/807 | (2013.01) |
| H04W 28/12 | (2009.01) |
| H04L 1/18 | (2006.01) |
| H04L 5/00 | (2006.01) |
| H04L 1/16 | (2006.01) |
| H04L 5/14 | (2006.01) |

(52) U.S. Cl.
CPC ......... *H04W 72/0406* (2013.01); *H04L 1/1607* (2013.01); *H04L 1/18* (2013.01); *H04L 1/1887* (2013.01); *H04L 5/00* (2013.01); *H04L 5/001* (2013.01); *H04L 5/0055* (2013.01); *H04L 5/1469* (2013.01); *H04L 47/27* (2013.01); *H04W 28/12* (2013.01); *H04L 1/1812* (2013.01)

(58) Field of Classification Search
None
See application file for complete search history.

(56) References Cited

U.S. PATENT DOCUMENTS

2012/0099491 A1*   4/2012   Lee et al. .................. 370/280

\* cited by examiner

*Primary Examiner* — Afshawn Towfighi
(74) *Attorney, Agent, or Firm* — Thorpe North & Western LLP

(57) ABSTRACT

Technology to support Hybrid Automatic Retransmission reQuest (HARQ) for Carrier Aggregation (CA) is disclosed. For example, a device, at a processor residing on a User Equipment (UE), includes a sizing module and a window module. The sizing module can be configured to determine a first size of a first bundling window for a first Component Carrier (CC) and a second size of a second bundling window for a second CC. The window module can be configured to: generate a first virtual window comprising a selected number of DownLink (DL) sub-frames in the first bundling window that are added to DL sub-frames in the second bundling window; and generate a second virtual window comprising remaining DL sub-frames from the first bundling window that are not added to the first virtual window. The selected number of DL sub-frames can be proportional to a difference between the first size and the second size.

27 Claims, 23 Drawing Sheets

| UL-DL configuration for PDSCH HARQ timing reference | | SCell SIB1 UL-DL configuration | | | | | | |
|---|---|---|---|---|---|---|---|---|
| | | 0 | 1 | 2 | 3 | 4 | 5 | 6 |
| PCell SIB1 UL-DL configuration | 0 | 0 | 1 | 2 | 3 | 4 | 5 | 6 |
| | 1 | 1 | 1 | 2 | 4 | 4 | 5 | 1 |
| | 2 | 2 | 2 | 2 | 5 | 5 | 5 | 2 |
| | 3 | 3 | 4 | 5 | 3 | 4 | 5 | 3 |
| | 4 | 4 | 4 | 5 | 4 | 4 | 5 | 4 |
| | 5 | 5 | 5 | 5 | 5 | 5 | 5 | 5 |
| | 6 | 6 | 1 | 2 | 3 | 4 | 5 | 6 |

FIG. 6
(Table 3)

| HARQ-ACK(0), HARQ-ACK(1), HARQ-ACK(2), HARQ-ACK(3) | Mapped state |
|---|---|
| 'D, any, any, any' or no DL assignment is received. | D, D |
| 'A, D, D, D' | A, N |
| 'A, A, N/D, any' | N, A |
| 'A, A, A, N/D' | A, A |
| 'A, A, A, A' | A, N |
| 'N, any, any, any' or 'A, D/N, any, any except for A, D, D, D' | N, N |

FIG. 7
(Table 4)

| HARQ-ACK(0), HARQ-ACK(1), HARQ-ACK(2) | Mapped state |
|---|---|
| ACK, ACK, ACK | ACK, ACK |
| ACK, ACK, NACK/DTX | NACK/DTX, ACK |
| ACK, NACK/DTX, any | ACK, NACK/DTX |
| NACK/DTX, any, any | NACK/DTX, NACK/DTX |

FIG. 8
(Table 5)

| PCC b0 | PCC/SCC b1 | SCC b2 | SCC b3 | PUCCH A/N resource (h#) RA & Data | Data Constant |
|---|---|---|---|---|---|
| D | | | | DTX | |
| N | N/D | N/D | N/D | h0 | 1 |
| A | N/D | N/D | N/D | h0 | -1 |
| N/D | A | N/D | N/D | h1 | -1 |
| A | A | N/D | N/D | h1 | 1 |
| N/D | N/D | A | N/D | h2 | 1 |
| A | N/D | A | N/D | h2 | -1 |
| N/D | A | A | N/D | h2 | -1 |
| A | A | A | N/D | h3 | 1 |
| N/D | N/D | N/D | A | h0 | 1 |
| A | N/D | N/D | A | h3 | -1 |
| N/D | A | N/D | A | h0 | 1 |
| A | A | N/D | A | h3 | -1 |
| N/D | N/D | A | A | h3 | 1 |
| A | N/D | A | A | h1 | 1 |
| N/D | A | A | A | | |
| A | A | A | A | h1 | -1 |

1 bit | 2 bit | 3 bit | 4 bit

FIG. 9
(Table 6)

| Index | $M_1=2$ | $M_2 = 3$ or $M_1=3$ | $M_2=4$ |
|---|---|---|---|
| | HARQ-ACK(0), HARQ-ACK(1) | HARQ-ACK(0), HARQ-ACK(1), HARQ-ACK(2) | HARQ-ACK(0), HARQ-ACK(1), HARQ-ACK(2), HARQ-ACK(3) |
| 0 | ACK, NACK/DTX → | ACK, NACK/DTX, any → | ACK, DTX, DTX, DTX |
| 1 | NACK/DTX, ACK | ACK, ACK, NACK/DTX | ACK, ACK, NACK/DTX, any |
| 2 | ACK, ACK → | ACK, ACK, ACK → | ACK, ACK, ACK, NACK/DTX |
| 3 | DTX, DTX → | DTX, any, any → | DTX, any, any, any |
| 4 | NACK, NACK → | NACK/DTX, any, any → | N, any, any, any |

Sharing the same mapped PUCCH state after channel selection

FIG. 15
(Table 7)

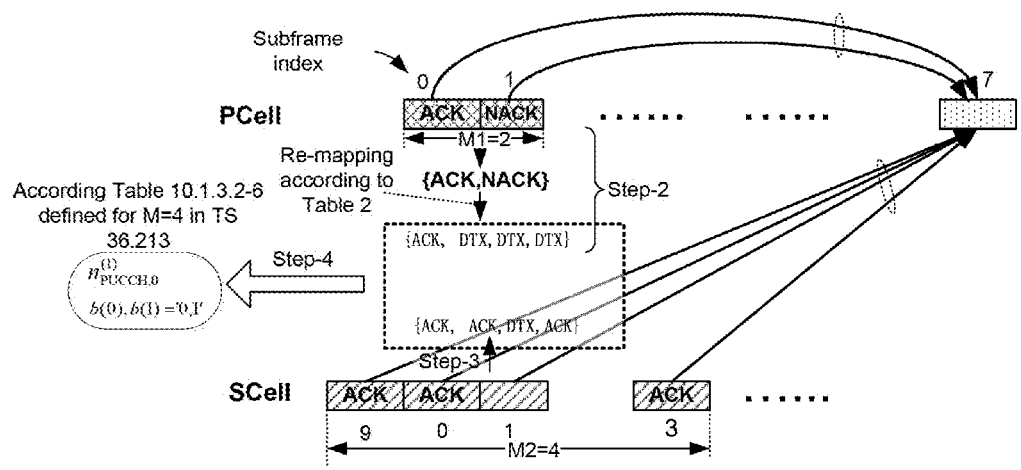

FIG. 16

| HARQ-ACK(0), HARQ-ACK(1) | $n_{PUCCH}^{(1)}$ | $b(0), b(1)$ |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | | No transmission |

FIG. 21
(Table 8)

| HARQ-ACK(0), HARQ-ACK(1), HARQ-ACK(2) | $n_{PUCCH}^{(1)}$ | $b(0), b(1)$ |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 1 |
| ACK, NACK/DTX, ACK | $n_{PUCCH,0}^{(1)}$ | 1, 1 |
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | | No transmission |

FIG. 22
(Table 9)

| HARQ-ACK(0), HARQ-ACK(1), HARQ-ACK(2), HARQ-ACK(3) | $n^{(1)}_{PUCCH}$ | $b(0),b(1)$ |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | No transmission | |

FIG. 23
(Table 10)

| HARQ-ACK(0), HARQ-ACK(1) | $n^{(1)}_{PUCCH}$ | $b(0)b(1)$ |
|---|---|---|
| ACK, ACK | $n^{(1)}_{PUCCH,1}$ | 1, 0 |
| ACK, NACK/DTX | $n^{(1)}_{PUCCH,0}$ | 1, 1 |
| NACK/DTX, ACK | $n^{(1)}_{PUCCH,1}$ | 0, 1 |
| NACK, NACK/DTX | $n^{(1)}_{PUCCH,0}$ | 0, 0 |
| DTX, NACK/DTX | No Transmission | |

FIG. 24
(Table 11)

| HARQ-ACK(0), HARQ-ACK(1), HARQ-ACK(2) | $n^{(1)}_{PUCCH}$ | $b(0)b(1)$ |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 0 |
| ACK, NACK/DTX, ACK | $n^{(1)}_{PUCCH,2}$ | 1, 0 |
| ACK, NACK/DTX, NACK/DTX | $n^{(1)}_{PUCCH,0}$ | 1, 1 |
| NACK/DTX, ACK, ACK | $n^{(1)}_{PUCCH,2}$ | 0, 1 |
| NACK/DTX, ACK, NACK/DTX | $n^{(1)}_{PUCCH,1}$ | 0, 1 |
| NACK/DTX, NACK/DTX, ACK | $n^{(1)}_{PUCCH,2}$ | 0, 0 |
| NACK, NACK/DTX, NACK/DTX | $n^{(1)}_{PUCCH,0}$ | 0, 0 |
| DTX, NACK/DTX, NACK/DTX | No Transmission | |

FIG. 25
(Table 12)

| HARQ-ACK(0), HARQ-ACK(1), HARQ-ACK(2), HARQ-ACK(3) | $n^{(1)}_{PUCCH}$ | $b(0)b(1)$ |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,2}$ | 1, 1 |
| ACK, ACK, NACK/DTX, ACK | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 1, 1 |
| ACK, NACK/DTX, ACK, NACK/DTX | $n^{(1)}_{PUCCH,2}$ | 1, 0 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,1}$ | 0, 0 |
| NACK/DTX, ACK, ACK, NACK/DTX | $n^{(1)}_{PUCCH,2}$ | 0, 1 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| NACK, NACK/DTX, NACK/DTX, NACK/DTX | $n^{(1)}_{PUCCH,0}$ | 0, 0 |
| DTX, NACK/DTX, NACK/DTX, NACK/DTX | No Transmission | |

FIG. 26
(Table 13)

| Primary Cell HARQ-ACK(0), HARQ-ACK(1), HARQ-ACK(2) | Secondary Cell HARQ-ACK(0), HARQ-ACK(1), HARQ-ACK(2) | Resource $n^{(1)}_{PUCCH}$ | Constellation $b(0), b(1)$ | RM Code Input Bits $o(0), o(1), o(2), o(3)$ |
|---|---|---|---|---|
| ACK, ACK, ACK | ACK, ACK, ACK | $n^{(1)}_{PUCCH,1}$ | 1, 1 | 1, 1, 1, 1 |
| ACK, ACK, NACK/DTX | ACK, ACK, ACK | $n^{(1)}_{PUCCH,1}$ | 0, 0 | 1, 0, 1, 1 |
| ACK, NACK/DTX, any | ACK, ACK, ACK | $n^{(1)}_{PUCCH,3}$ | 1, 1 | 0, 1, 1, 1 |
| NACK/DTX, any, any | ACK, ACK, ACK | $n^{(1)}_{PUCCH,3}$ | 0, 1 | 0, 0, 1, 1 |
| ACK, ACK, ACK | ACK, ACK, NACK/DTX | $n^{(1)}_{PUCCH,0}$ | 1, 0 | 1, 1, 1, 0 |
| ACK, ACK, NACK/DTX | ACK, ACK, NACK/DTX | $n^{(1)}_{PUCCH,3}$ | 1, 0 | 1, 0, 1, 0 |
| ACK, NACK/DTX, any | ACK, ACK, NACK/DTX | $n^{(1)}_{PUCCH,0}$ | 0, 1 | 0, 1, 1, 0 |
| NACK/DTX, any, any | ACK, ACK, NACK/DTX | $n^{(1)}_{PUCCH,3}$ | 0, 0 | 0, 0, 1, 0 |
| ACK, ACK, ACK | ACK, NACK/DTX, any | $n^{(1)}_{PUCCH,2}$ | 1, 1 | 1, 1, 0, 1 |
| ACK, ACK, NACK/DTX | ACK, NACK/DTX, any | $n^{(1)}_{PUCCH,2}$ | 0, 1 | 1, 0, 0, 1 |
| ACK, NACK/DTX, any | ACK, NACK/DTX, any | $n^{(1)}_{PUCCH,2}$ | 1, 0 | 0, 1, 0, 1 |
| NACK/DTX, any, any | ACK, NACK/DTX, any | $n^{(1)}_{PUCCH,2}$ | 0, 0 | 0, 0, 0, 1 |
| ACK, ACK, ACK | NACK/DTX, any, any | $n^{(1)}_{PUCCH,1}$ | 1, 0 | 1, 1, 0, 0 |
| ACK, ACK, NACK/DTX | NACK/DTX, any, any | $n^{(1)}_{PUCCH,1}$ | 0, 1 | 1, 0, 0, 0 |
| ACK, NACK/DTX, any | NACK/DTX, any, any | $n^{(1)}_{PUCCH,0}$ | 1, 1 | 0, 1, 0, 0 |
| NACK, any, any | NACK/DTX, any, any | $n^{(1)}_{PUCCH,0}$ | 0, 0 | 0, 0, 0, 0 |
| DTX, any, any | NACK/DTX, any, any | No Transmission | | 0, 0, 0, 0 |

FIG. 27
(Table 14)

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation $b(0), b(1)$ | RM Code Input Bits $o(0), o(1), o(2), o(3)$ |
|---|---|---|---|---|
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |

FIG. 28
(Table 15)

US 9,088,977 B2

HYBRID AUTOMATIC REPEAT REQUEST (HARQ) MAPPING FOR CARRIER AGGREGATION (CA)

RELATED APPLICATIONS

This application claims the benefit of and hereby incorporates by reference U.S. Provisional Patent Application Ser. No. 61/653,369, filed May 30, 2012, and U.S. Provisional Patent Application Ser. No. 61/667,325, filed Jul. 2, 2012.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD). Time-division duplexing (TDD) is an application of time-division multiplexing (TDM) to separate downlink and uplink signals (or separate signals to a UE or from the UE in D2D communication). In TDD, downlink signals and uplink signals may be carried on a same carrier frequency (i.e., shared carrier frequency) where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as sub-channels in one communication channel, but are physically transmitted on different resources. In frequency-division duplexing (FDD), an uplink transmission and a downlink transmission (or a transmission to and from a UE in D2D communication) can operate using different frequency carriers (i.e. separate carrier frequency for each transmission direction). In FDD, interference can be avoided because the downlink signals use a different frequency carrier from the uplink signals.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 6 (i.e., Table 3) illustrates a table of an UpLink-DownLink (UL-DL) configuration number of Physical Downlink Shared CHannel (PDSCH) Hybrid Automatic Retransmission re-Quest-ACKnowledge (HARQ-ACK) timing reference for a Secondary Cell (SCell) in accordance with an example;

FIG. 7 (i.e., Table 4) illustrates a table of a transmission of hybrid automatic repeat request-acknowledgement (HARQ-ACK) multiplexing for a bundling window size of M=4 in accordance with an example;

FIG. 8 (i.e., Table 5) illustrates a table of a transmission of hybrid automatic repeat request-acknowledgement (HARQ-ACK) multiplexing for a bundling window size of M=3 in accordance with an example;

FIG. 9 (i.e., Table 6) illustrates a table of a hybrid automatic repeat request-acknowledgement (HARQ-ACK) mapping table for physical uplink control channel (PUCCH) format 1b with channel selection (CS) in accordance with an example;

FIG. 15 (i.e., Table 7) illustrates a table of a hybrid automatic repeat request-acknowledgement (HARQ-ACK) look-up mapping table for different uplink-downlink (UL-DL) configurations of inter-band time division duplex (TDD) carrier aggregation (CA) in accordance with an example;

FIG. 16 illustrates a method for hybrid automatic repeat request-acknowledgement (HARQ-ACK) mapping for a mapping table with M=max $\{M_1, M_2\}$ in accordance with an example;

FIG. 21 (i.e., Table 8) illustrates a table of a transmission of hybrid automatic repeat request-acknowledgement (HARQ-ACK) multiplexing for a bundling window size of M=2 (i.e., 3GPP LTE standard Release 11 Technical Specification (TS) 36.213 Table 10.1.3-2) in accordance with an example;

FIG. 22 (i.e., Table 9) illustrates a table of a transmission of hybrid automatic repeat request-acknowledgement (HARQ-ACK) multiplexing for a bundling window size of M=3 (i.e., 3GPP LTE standard Release 11 Technical Specification (TS) 36.213 Table 10.1.3-3) in accordance with an example;

FIG. 23 (i.e., Table 10) illustrates a table of a transmission of hybrid automatic repeat request-acknowledgement (HARQ-ACK) multiplexing for a bundling window size of M=4 (i.e., 3GPP LTE standard Release 11 Technical Specification (TS) 36.213 Table 10.1.3-4) in accordance with an example;

FIG. 24 (i.e., Table 11) illustrates a table of a transmission of hybrid automatic repeat request-acknowledgement (HARQ-ACK) multiplexing for a bundling window size of M=2 (i.e., 3GPP LTE standard Release 11 Technical Specification (TS) 36.213 Table 10.1.3-5) in accordance with an example;

FIG. 25 (i.e., Table 12) illustrates a table of a transmission of hybrid automatic repeat request-acknowledgement (HARQ-ACK) multiplexing for a bundling window size of M=3 (i.e., 3GPP LTE standard Release 11 Technical Specification (TS) 36.213 Table 10.1.3-6) in accordance with an example;

FIG. 26 (i.e., Table 13) illustrates a table of a transmission of hybrid automatic repeat request-acknowledgement (HARQ-ACK) multiplexing for a bundling window size of M=4 (i.e., 3GPP LTE standard Release 11 Technical Specification (TS) 36.213 Table 10.1.3-7) in accordance with an example;

FIG. 27 (i.e., Table 14) illustrates a table of a transmission of hybrid automatic repeat request-acknowledgement (HARQ-ACK) multiplexing for a bundling window size of M=3 (i.e., 3GPP LTE standard Release 11 Technical Specification (TS) 36.213 Table 10.1.3.2-5) in accordance with an example; and FIG. 28 (i.e., Table 15) illustrates a table of a transmission of hybrid automatic repeat request-acknowledgement (HARQ-ACK) multiplexing for a bundling window size of M=3 (i.e., 3GPP LTE standard Release 11 Technical Specification (TS) 36.213 Table 10.1.3.2-6) in accordance with an example.

Figure 1:
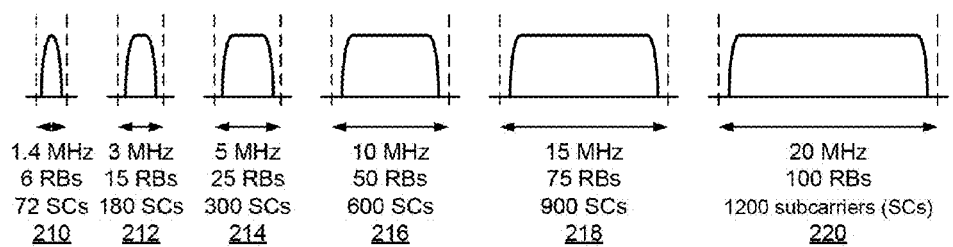
FIG. 1 illustrates a block diagram of various component carrier (CC) bandwidths in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

An increase in the amount of wireless data transmission has created congestion in wireless networks using licensed spectrum to provide wireless communication services for wireless devices, such as smart phones and tablet devices. The congestion is especially apparent in high density and high use locations such as urban locations and universities.

One technique for providing additional bandwidth capacity to wireless devices is through the use carrier aggregation of multiple smaller bandwidths to form a virtual wideband channel at a wireless device (e.g., UE). In carrier aggregation (CA) multiple component carriers (CC) can be aggregated and jointly used for transmission to/from a single terminal. Carriers can be signals in permitted frequency domains onto which information is placed. The amount of information that can be placed on a carrier can be determined by the aggregated carrier's bandwidth in the frequency domain. The permitted frequency domains are often limited in bandwidth. The bandwidth limitations can become more severe when a large number of users are simultaneously using the bandwidth in the permitted frequency domains.

FIG. 1 illustrates a carrier bandwidth, signal bandwidth, or a component carrier (CC) that can be used by the wireless device. For example, the LTE CC bandwidths can include: 1.4 MHz 210, 3 MHz 212, 5 MHz 214, 10 MHz 216, 15 MHz 218, and 20 MHz 220. The 1.4 MHz CC can include 6 resource blocks (RBs) comprising 72 subcarriers. The 3 MHz CC can include 15 RBs comprising 180 subcarriers. The 5 MHz CC can include 25 RBs comprising 300 subcarriers. The 10 MHz CC can include 50 RBs comprising 600 subcarriers. The 15 MHz CC can include 75 RBs comprising 900 subcarriers. The 20 MHz CC can include 100 RBs comprising 1200 subcarriers.

Carrier aggregation (CA) enables multiple carrier signals to be simultaneously communicated between a user's wireless device and a node. Multiple different carriers can be used. In some instances, the carriers may be from different permitted frequency domains. Carrier aggregation provides a broader choice to the wireless devices, enabling more bandwidth to be obtained. The greater bandwidth can be used to communicate bandwidth intensive operations, such as streaming video or communicating large data files.

Figure 2A:
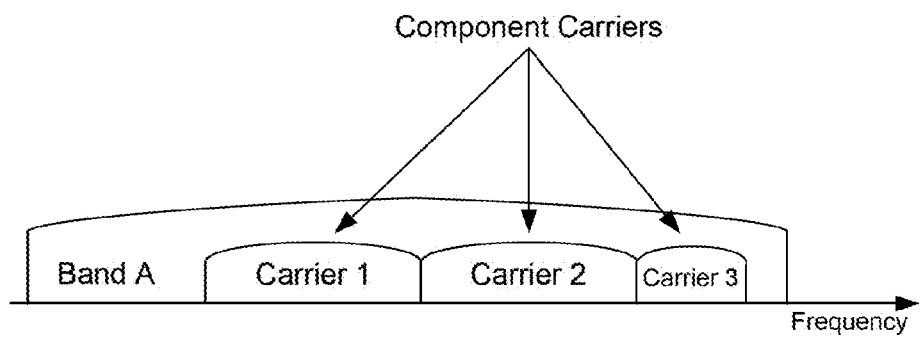
FIG. 2A illustrates a block diagram of multiple contiguous component carriers in accordance with an example.

FIG. 2A illustrates an example of carrier aggregation of continuous carriers. In the example, three carriers are contiguously located along a frequency band. Each carrier can be referred to as a component carrier. In a continuous type of system, the component carriers are located adjacent one another and can be typically located within a single frequency band (e.g., band A). A frequency band can be a selected frequency range in the electromagnetic spectrum. Selected frequency bands are designated for use with wireless communications such as wireless telephony. Certain frequency bands are owned or leased by a wireless service provider. Each adjacent component carrier may have the same bandwidth, or different bandwidths. A bandwidth is a selected portion of the frequency band. Wireless telephony has traditionally been conducted within a single frequency band. In contiguous carrier aggregation, only one fast Fourier transform (FFT) module and/or one radio frontend may be used. The contiguous component carriers can have similar propagation characteristics which can utilize similar reports and/or processing modules.

Figure 2B:
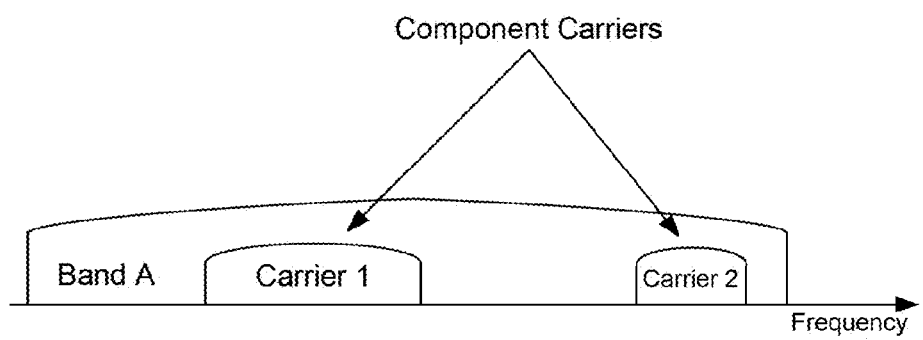
FIG. 2B illustrates a block diagram of intra-band non-contiguous component carriers in accordance with an example.
Figure 2C:
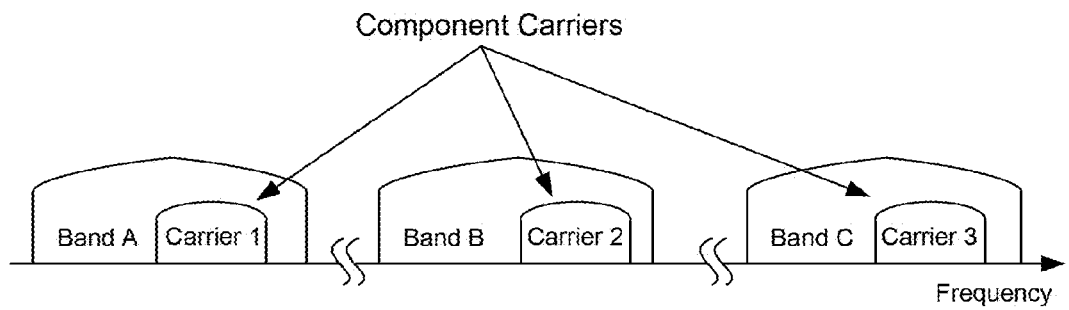
FIG. 2C illustrates a block diagram of inter-band non-contiguous component carriers in accordance with an example.

FIGS. 2B-2C illustrates an example of carrier aggregation of non-continuous component carriers. The non-continuous component carriers may be separated along the frequency range. Each component carrier may even be located in different frequency bands. Non-contiguous carrier aggregation can provide aggregation of a fragmented spectrum. Intra-band (or single-band) non-contiguous carrier aggregation provides non-contiguous carrier aggregation within a same frequency band (e.g., band A), as illustrated in FIG. 2B. Inter-band (or multi-band) non-contiguous carrier aggregation provides non-contiguous carrier aggregation within different frequency bands (e.g., bands A, B, or C), as illustrated in FIG. 2C. The ability to use component carriers in different frequency bands can enable more efficient use of available bandwidth and increases the aggregated data throughput.

Figure 3A:
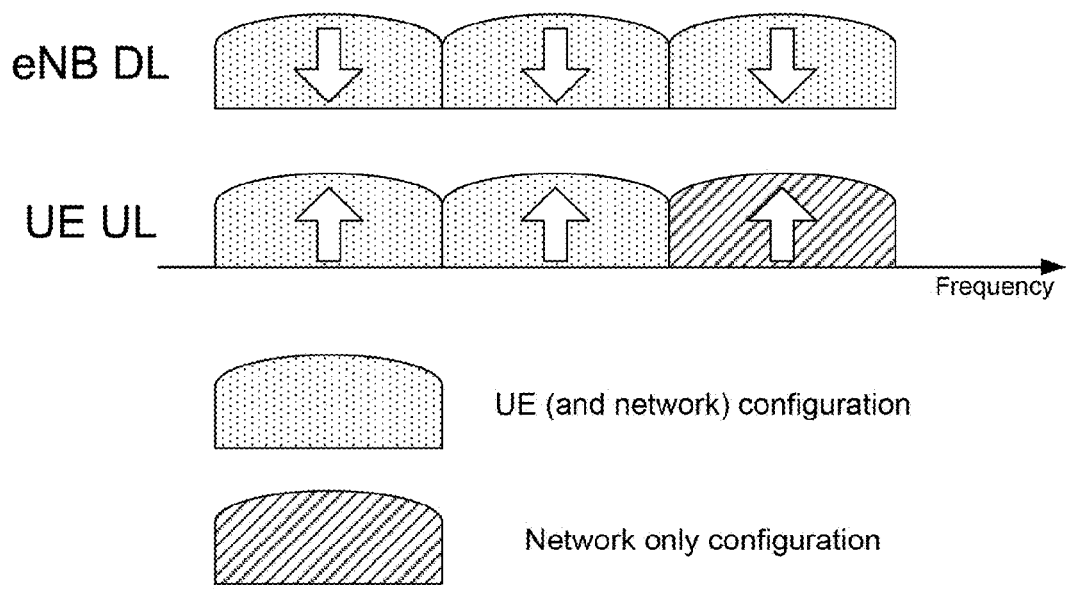
FIG. 3A illustrates a block diagram of a symmetric-asymmetric carrier aggregation configuration in accordance with an example.
Figure 3B:
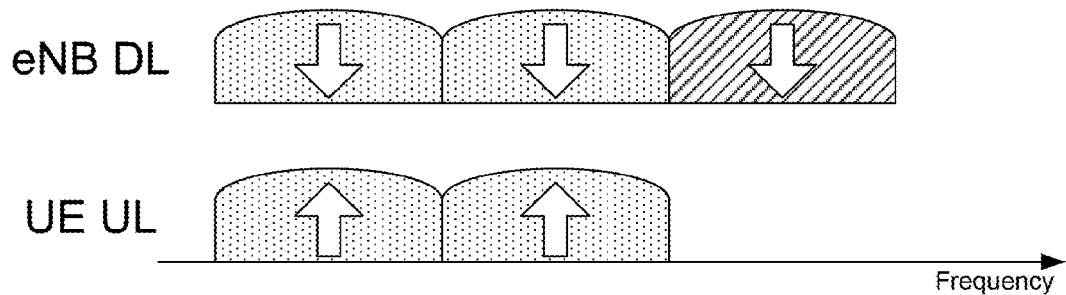
FIG. 3B illustrates a block diagram of an asymmetric-symmetric carrier aggregation configuration in accordance with an example.

Network symmetric (or asymmetric) carrier aggregation can be defined by a number of downlink (DL) and uplink (UL) component carriers offered by a network in a sector. UE symmetric (or asymmetric) carrier aggregation can be defined by a number of downlink (DL) and uplink (UL) component carriers configured for a UE. The number of DL CCs may be at least the number of UL CCs. A system information block type 2 (SIB2) can provide specific linking between the DL and the UL. FIG. 3A illustrates a block diagram of a symmetric-asymmetric carrier aggregation configuration, where the carrier aggregation is symmetric between the DL and UL for the network and asymmetric between the DL and UL for the UE. FIG. 3B illustrates a block diagram of an asymmetric-symmetric carrier aggregation configuration, where the carrier aggregation is asymmetric between the DL and UL for the network and symmetric between the DL and UL for the UE.

For each UE, a CC can be defined as a primary cell (PCell). Different UEs may not necessarily use a same CC as their PCell. The PCell can be regarded as an anchor carrier for the UE and the PCell can thus be used for control signaling functionalities, such as radio link failure monitoring, hybrid automatic repeat request-acknowledgement (HARQ-ACK), and PUCCH resource allocations (RA). If more than one CC is configured for a UE, the additional CCs can be denoted as secondary cells (SCells) for the UE.

Figure 4:
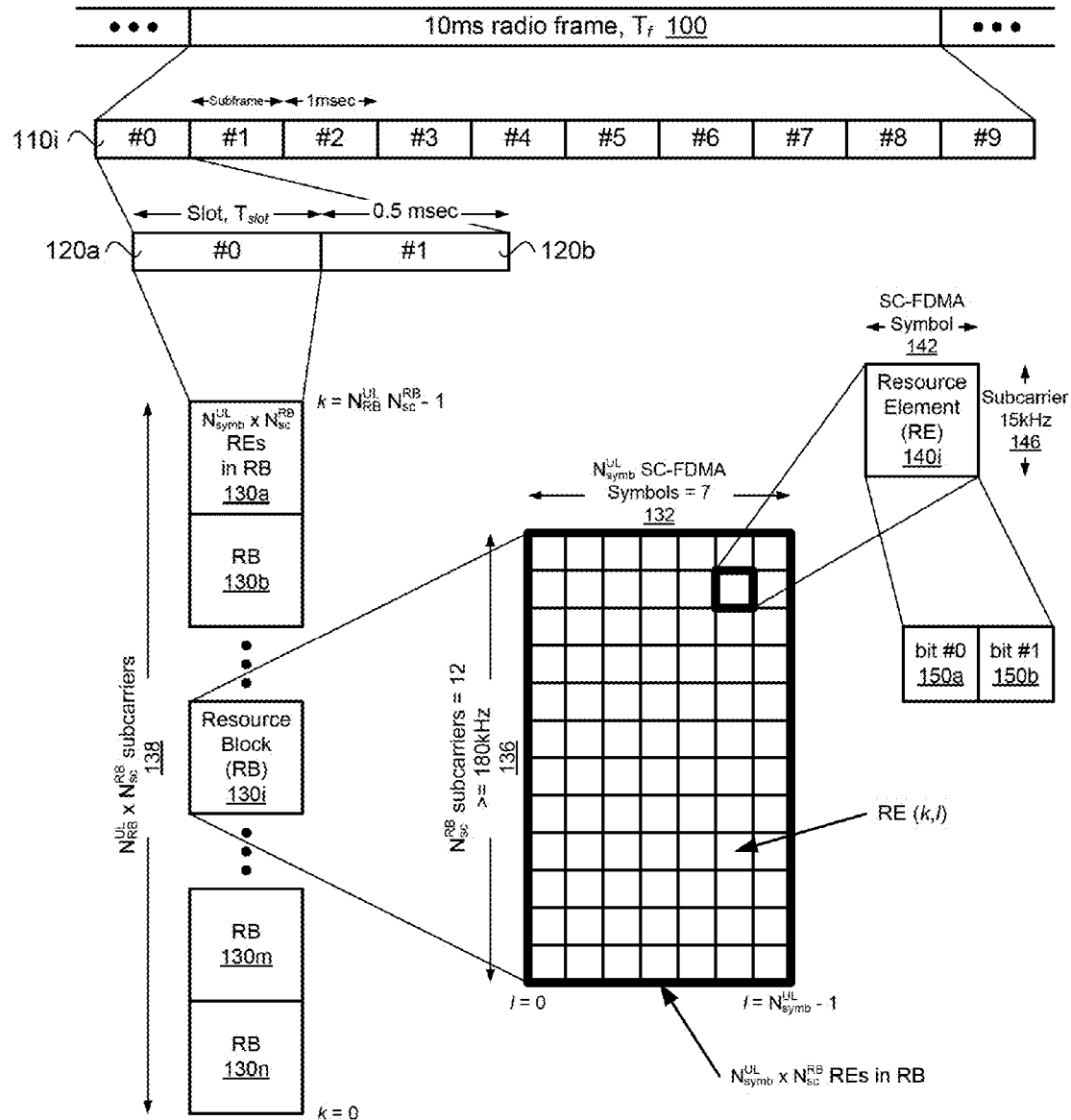
FIG. 4 illustrates a block diagram of uplink radio frame resources (e.g., a resource grid) in accordance with an example.

A component carrier can be used to carry channel information via a radio frame structure transmitted on the physical (PHY) layer in a uplink transmission between a node (e.g., eNodeB) and the wireless device (e.g., UE) using a generic long term evolution (LTE) frame structure, as illustrated in FIG. 4. While an LTE frame structure is illustrated, a frame structure for an IEEE 802.16 standard (WiMax), an IEEE 802.11 standard (WiFi), or another type of communication standard using SC-FDMA or OFDMA may also be used.

FIG. 4 illustrates an uplink radio frame structure. A similar structure can be used for a downlink radio frame structure using OFDMA. In the example, a radio frame 100 of a signal used to transmit control information or data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$, of 0.5 ms. Each slot for a component carrier (CC) used by the wireless device and the node can include multiple resource blocks (RBs) 130$a$, 130$b$, 130$i$, 130$m$, and 130$n$ based on the CC frequency bandwidth. Each RB (physical RB or PRB) 130$i$ can include 12-15 kHz subcarriers 136 (on the frequency axis) and 6 or 7 SC-FDMA symbols 132 (on the time axis) per subcarrier. The RB can use seven SC-FDMA symbols if a short or normal cyclic prefix is employed. The RB can use six SC-FDMA symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one SC-FDMA symbol 142 by one subcarrier (i.e., 15 kHz) 146. Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for an uplink transmission from the wireless device to the node.

An uplink signal or channel can include data on a Physical Uplink Shared CHannel (PUSCH) or control information on a Physical Uplink Control CHannel (PUCCH). In LTE, the uplink physical channel (PUCCH) carrying uplink control information (UCI) can include channel state information (CSI) reports, Hybrid Automatic Retransmission reQuest (HARQ) ACKnowledgment/Negative ACKnowledgment (ACK/NACK) and uplink scheduling requests (SR).

The wireless device (e.g., UE) can provide HARQ-ACK feedback for a PDSCH using a PUCCH. The PUCCH can support multiple formats (i.e., PUCCH format) with various modulation and coding schemes (MCS), as shown for LTE in Table 1. Similar information to Table 1 can be shown in 3GPP LTE standard Release 11 (e.g., V11.1.0 (2012-12)) Technical Specification (TS) 36.211 Table 5.4-1. For example, PUCCH format 1b can be used to convey a two-bit HARQ-ACK, which can be used for carrier aggregation.

TABLE 1

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

Legacy LTE TDD can support asymmetric UL-DL allocations by providing seven different semi-statically configured uplink-downlink configurations. Table 2 illustrates seven UL-DL configurations used in LTE, where "D" represents a downlink subframe, "S" represents a special subframe, and "U" represents an uplink subframe. In an example, the special subframe can operate or be treated as a downlink subframe. Similar information to Table 2 can be shown in 3GPP LTE TS 36.211 Table 4.2-2.

TABLE 2

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

As illustrated by Table 2, UL-DL configuration 0 can include 6 uplink subframes in subframes 2, 3, 4, 7, 8, and 9, and 4 downlink and special subframes in subframes 0, 1, 5, and 6; and UL-DL configuration 5 can include one uplink subframe in subframe 2, and 9 downlink and special subframes in subframes 0, 1, and 3-9.

As an underlying requirement in some examples, cells of the network change UL-DL (TDD) configurations synchronously in order to avoid the interference. However, such a requirement can constrain the traffic management capabilities in different cells of the network. The legacy LTE TDD set of configurations can provide DL subframe allocations in the range between 40% and 90%, as shown in Table 2. The UL and DL subframes allocation within a radio frame can be reconfigured through system information broadcast signaling (e.g., system information block [SIB]). Hence, the UL-DL allocation once configured can be expected to vary semi-statically.

Figure 5:
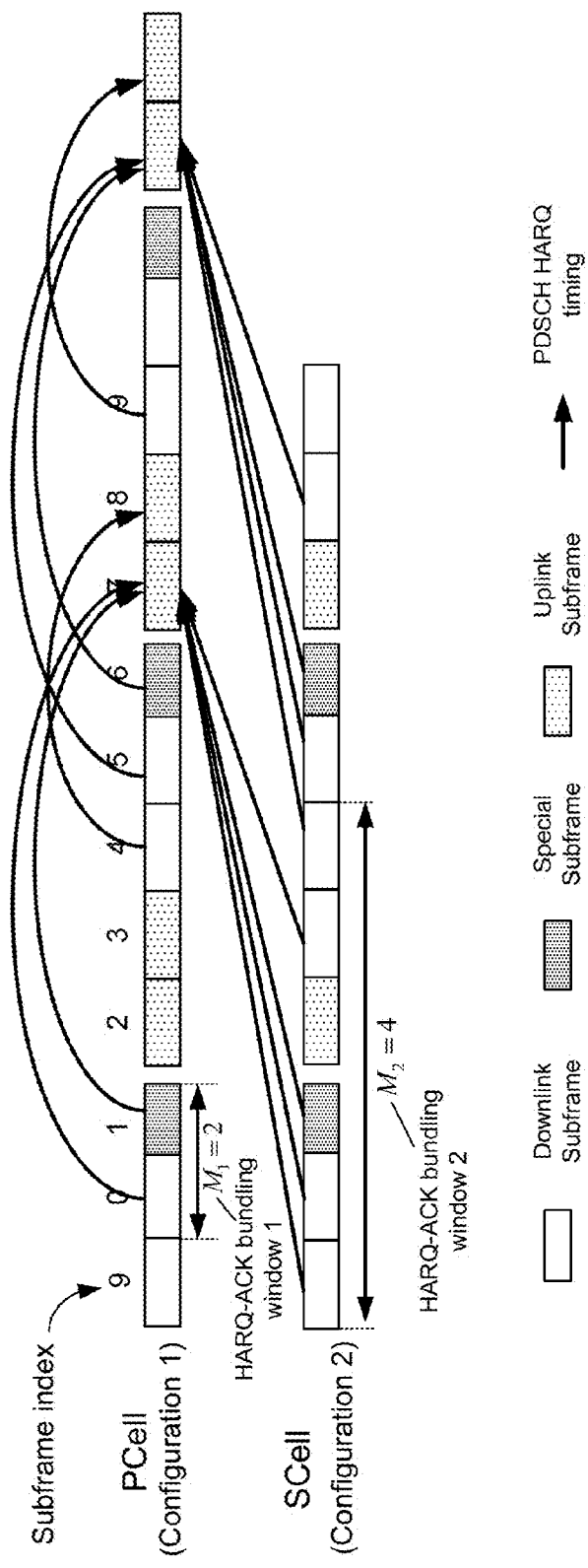
FIG. 5 illustrates different hybrid automatic repeat request-acknowledgement (HARQ-ACK) bundling windows in time division duplex (TDD) inter-band carrier aggregation (CA) scenario in accordance with an example.

A property of TDD is that a number of UL and DL subframes can be different as shown in Table 2 and often the number of DL subframes can be more than the number of UL subframes for a radio frame. In configurations where more DL subframes are used than UL subframes, multiple DL sub-frames can be associated with one single UL subframe for the transmission of a corresponding control signals. A configuration-specific HARQ-ACK timing relationship can be defined (e.g., 3GPP LTE standard Release 11 (e.g., V11.1.0 (2012-12)) TS 36.213 Table 10.1.3.1-1). If a UE is scheduled in a multiple of DL subframes, which can be associated with one UL subframe, the UE can transmit multiple ACK/NAK (ACK/NACK) bits in that UL subframe. A number of DL subframes with HARQ-ACK feedback on one single UL subframe can comprise one bundling window. As shown in FIG. 5, the subframe 0 and 1 can comprise one bundling window on a PCell according a predefined HARQ-ACK timing relation for UL-DL configuration 1, while correspondingly, subframe 9 of previous radio frame, subframe 0, 1 and 3 comprise the HARQ-ACK bundling window on a SCell according to the HARQ-ACK timing defined for configuration 2 for uplink subframe 7. In an example, HARQ-ACK bundling window may not be used for configuration 5, with 9 DL subframes.

An advantage of a Time Division Duplex (TDD) system can be a flexible resource utilization through different TDD configurations to better match the uplink and downlink traffic characteristics of the cell. By configuring different TDD configurations, the ratio between available UpLink (UL) and DownLink (DL) resources can range from 3UL:2DL (6UL:4DL) to 1 UL:9DL. In legacy LTE TDD (e.g., LTE Release 10 (Rel-10) specification), only the aggregation of TDD Component Carriers (CCs) of a same UL-DL configuration may be defined and supported. While the same UL-DL configuration can simplify a design and operation of CC, the same UL-DL configuration can also impose some limitations. In an example, inter-band carrier aggregation (CA) for a TDD system with different uplink-downlink configurations on different bands can be supported. For instance, more than one TDD carrier can be deployed by a single TDD operator and the carriers can be aggregated at a single base station (e.g., node). Besides, a separation between two carrier frequencies can be large enough to avoid UL-DL interference from a same device. Some of the benefits of inter-band CA with different TDD configurations on different bands can be include (1) legacy system co-existence, (2) heterogeneous network (Het-Net) support, (3) aggregation of traffic-dependent carriers, (4) flexible configuration (e.g., more UL subframe in lower bands for better coverage, and more DL subframes in higher bands), and (5) higher peak rate.

Interband TDD CA with different UL-DL configurations in different bands can be supported. For example, a SCell PDSCH HARQ reference timing can be determined from a PCell UL-DL configuration and a SCell UL-DL configuration, as shown in Table 3 illustrated in FIG. 6. Table 1 (i.e., FIG. 6) illustrates the UL-DL configuration number of PDSCH HARQ-ACK timing reference for SCell. A HARQ-ACK timing of PCell PDSCH, the scheduling timing of PCell PUSCH, the HARQ timing of PCell PUSCH can use the PCell SIB1 configuration. A UE can be configured with PUCCH format 3 or PUCCH format 1b with channel selection (CS) for HARQ-ACK transmission for TDD inter-band carrier aggregation (CA) with different UL-DL configurations on different bands.

An implication of different UL-DL configurations can be that different number of downlink subframes can be bundled within bundling window in each cell. For example, as shown in FIG. 5, a PCell can use TDD configuration 1 and a SCell can use a TDD configuration 2. As illustrated, the size of bundling windows associated with the UL subframe 7 can be different for the two serving cells (e.g., PCell and SCell). For the PCell, the HARQ-ACK bundling window size is 2 comprising subframe {0, 1}, while for SCell, the HARQ-ACK bundling window size is 4 comprising subframe {9, 0, 1, 3}, as shown in FIG. 5. FIG. 5 illustrates different HARQ-ACK bundling windows in a TDD inter-band CA scenario.

Regarding the PUCCH format 1b with channel selection, a first solution can be that the UE assumes an M corresponding to M=max ($M_1$,$M_2$) (e.g., M=max (Mp, Ms) where Mp is the primary HARQ bundling window size and Ms is the secondary HARQ bundling window size) in selecting the corresponding mapping table for HARQ-ACK feedback. For a serving cell c∈{1, 2} with $M_c$<M, the UE can generate HARQ-ACK bits for M subframes by appending M−$M_c$ additional HARQ-ACK bit(s) in a case of single transport block (TB) transmission mode (TM) or 2*(M−$M_c$) additional HARQ-ACK bit(s) in a case of dual TB TM with, for example, discontinuous transmission (DTX) value(s). Using DTX values, an existing channel selection mapping table can be reused for inter-band CA without defining new mapping tables.

FIG. 7 (i.e., Table 4) illustrates a transmission of HARQ-ACK multiplexing for M=4. FIG. 8 (i.e., Table 5) illustrates a transmission of HARQ-ACK multiplexing for M=3. FIG. 9 (i.e., Table 6) illustrates a HARQ-ACK mapping table for PUCCH format 1b with channel selection (CS) for primary component carrier (PCC) and secondary component carrier (SCC) including constellation bits (e.g., b0, b1, b2, and b3) values (e.g., A for ACK, N for NACK, D for DTX, and D/N for DTX/NACK) and PUCCH ACK/NACK (A/N) resources (e.g., h #) for reference signals (RS) and data with data constants (const.) using 1-4 bits (e.g., M=1, M=2, M=3, or M=4) representing a HARQ-ACK bundling window.

Figure 10:
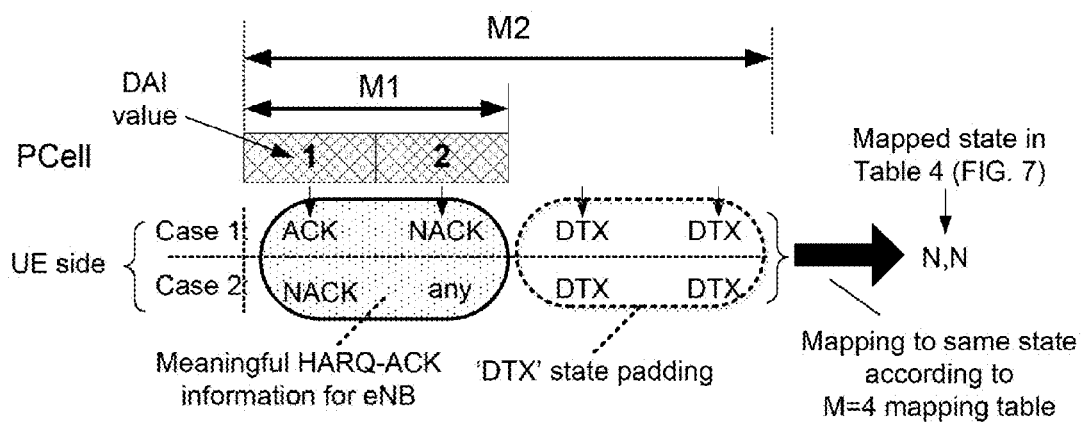
FIG. 10 illustrates a potential issue of a discontinuous transmission ("DTX") padding method in accordance with an example.

Table 4 (i.e., FIG. 7) can summarize a legacy HARQ-ACK mapping table for more than one configured serving cell case. As shown in Table 4, an overlapped state can occur for both of 'N, any, any, any" and "A, D/N, any, any except for A, D, D, D" (last row of Table 4). An overlap state can occur when a state represents more than one state. Taking into account the overlap mapped state in Table 4, some performance degradations on the serving cell characteristic of the smaller bundling window size can occur due to 'DTX' state padding in the first solution above. The issue with the first solution can be further shown in FIG. 10 using the example of FIG. 5 (e.g., configuration 1 on PCell and configuration 2 on SCell). FIG. 10 illustrates a HARQ-ACK mapping and potential performance loss on the PCell. The described legacy PUCCH feedback mechanism can also be reused for SCell. FIG. 10 schematically describes a potential issue of a "DTX" padding method (e.g., first solution).

An issue with a "DTX" padding method can be described as follows: As shown in FIG. 10, after padding the additional state with a 'DTX', the UE can generate a same mapped state "N, N" for the HARQ feedback regardless of the actual decoding results of PDSCH within the PCell's bundling window $M_1$ since both HARQ-ACK states "ACK, NACK, DTX, DTX" and "NACK, any, DTX, DTX" can be overlapped mapped to same state in a legacy "M=4" mapping table (e.g., LTE TS 36.213 Table 10.1.3-4 (Table 10 shown in FIG. 23) or 10.1.3-7 (Table 13 shown in FIG. 26)). For instance, padding additional HARQ-ACK states with 'DTX' can result in the HARQ-ACK state being unknown at a node (e.g., eNB) side and therefore the scheduling of PDSCHs on PCell can be potentially restricted at the eNB resulting in substantial DL throughput loss as the PCell may not be practically usable. In another example, carrier aggregation functionality can be severely impacted or almost disabled implicitly when "DTX" padding method (e.g., first solution) is used for PUCCH format 1b with channel selection.

Based on the issue with the described "DTX" padding method, some mechanisms and solutions can be used to alleviate the issue to enable CA functionality when PUCCH format 1b with channel selection and more than one CC with different UL-DL configurations are configured for the UE.

Figure 11A:
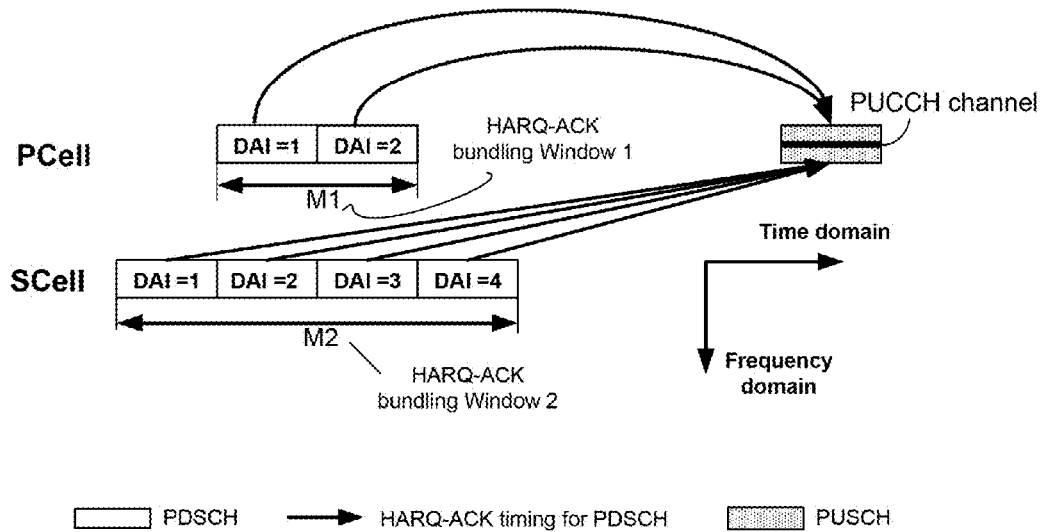
FIG. 11A schematically illustrates a hybrid automatic repeat request-acknowledgement (HARQ-ACK) timing for physical downlink shared channel (PDSCH) with inter-band time division duplex (TDD) carrier aggregation (CA) (e.g., different UL-DL configurations) in accordance with an example.
Figure 11B:
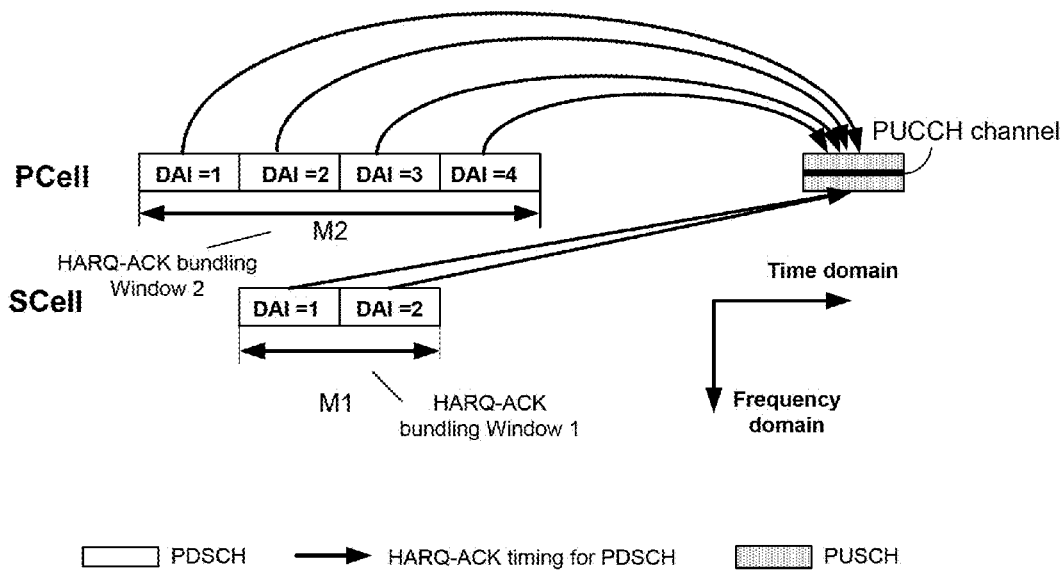
FIG. 11B schematically illustrates a hybrid automatic repeat request-acknowledgement (HARQ-ACK) timing for physical downlink shared channel (PDSCH) with inter-band time division duplex (TDD) carrier aggregation (CA) (e.g., different UL-DL configurations) in accordance with an example.

FIGS. 11A-B illustrate schematically a HARQ-ACK timing for PDSCH with inter-band TDD CA with different UL-DL configurations. FIG. 11A illustrates a generalized PDSCH HARQ-ACK carried on a PUCCH with a PCell with a HARQ-ACK bundling widow (e.g., window 1) size $M_1$=2 and a SCell with a HARQ-ACK bundling widow (e.g., window 2) size $M_2$=4. FIG. 11B illustrates a generalized PDSCH HARQ-ACK carried on a PUCCH with a PCell with a HARQ-ACK bundling widow (e.g., window 1) size $M_2$=4 and a SCell with a HARQ-ACK bundling widow (e.g., window 2) size $M_1$=2.

A HARQ-ACK bundling window can denote a multiple downlink subframe set associated with one uplink subframe to carry the HARQ-ACK feedback. A Downlink Assignment Index (DAI) can denote a counter for the number of dynamic downlink assignments transmitted within the bundling window. As illustrated in FIGS. 11A-B, the DAI value setting can be based on an assumption that PDSCH is available to be transmitted on each DL subframe of a bundling window, which may not occur in actual signaling.

Two cases are illustrates for HARQ-ACK PUCCH feedback schemes: HARQ-ACK bundling window size on PCell can be smaller than the HARQ-ACK bundling window size on SCell (Case 1, shown in FIG. 11A), or conversely, the bundling window size on PCell can larger than the HARQ-ACK bundling window size on SCell (Case 2, shown in FIG. 11B). Case 1 can be used to illustrate and elaborate technology (e.g., methods, devices, and computer circuitry) to address issues with the described "DTX" padding method. The technology can also be extended to Case 2 without any loss of generality. For illustration purposes, $M_1$ represents a size of a smaller PDSCH bundling window (e.g., HARQ-ACK bundling window 1 in FIG. 5) associated with an uplink subframe, while $M_2$ represents a size of larger PDSCH bundling window (e.g., HARQ-ACK bundling window 2 in FIG. 5).

A method 1 can be described as a DAI value counting within "virtual" HARQ-ACK bundling window generated for each CC. For instance, method 1 can be used to improve the PDSCH throughput performance by avoiding the use of an "M=4" table (e.g., LTE TS 36.213 Table Table 10.1.3-4 (Table 10 shown in FIG. 23) or 10.1.3-7 (Table 13 shown in FIG. 26)) and thereby avoiding an excessive HARQ-ACK overlapping states as previously described. A DAI in downlink grant can be redefined as counting each transmitted PDSCH within a "virtual" HARQ-ACK bundling window of each CC for method 1. In an example, based on a "new" DAI counting principle, the number of contiguous ACKs across the transmitted PDSCH within a "virtual" HARQ-ACK bundling window can be reported following a legacy timing-domain bundling mechanism (e.g., LTE release 10 (Rel-10) defined for PUCCH format 1b with channel selection Mode b.

Figure 12:
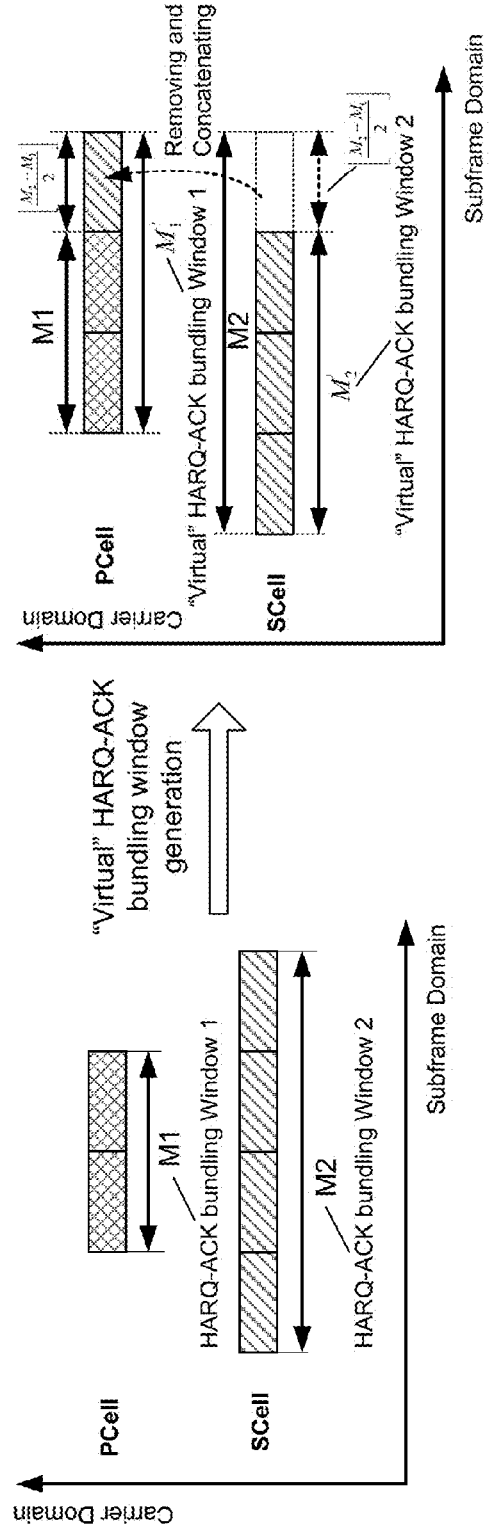
FIG. 12 illustrates a component carrier-specific (CC-specific) "virtual" bundling window generation process for hybrid automatic repeat request-acknowledgement (HARQ-ACK) mapping in accordance with an example.

In an example method, first, "virtual" HARQ-ACK bundling windows for PCell and SCell can be generated by moving the later $$\left\lfloor \frac{M_2 - M_1}{2} \right\rfloor$$

downlink subframe(s) of the larger bundling window ($M_2$) to the end of the downlink subframe of the smaller bundling window ($M_1$) to comprise a "virtual" bundling window on PCell, as shown in FIG. 12. FIG. 12 illustrates a CC-specific "virtual" bundling window generation procedure for HARQ-ACK mapping. Then, a 2-bit DAI in the DL grant can indicate the assigned downlink subframe (not necessarily a consecutive DL subframe) across the whole virtual HARQ-ACK bundling window. Then, a UE can perform channel selection according to a mapping table defined with M=M'$_1$ (for virtual HARQ-ACK bundling window 1) and M=M'$_2$ (for virtual HARQ-ACK bundling window 2) for TDD HARQ-ACK multiplexing with PUCCH format 1b with channel selection and two configured serving cells if configured.

Figures 13A, 13B:
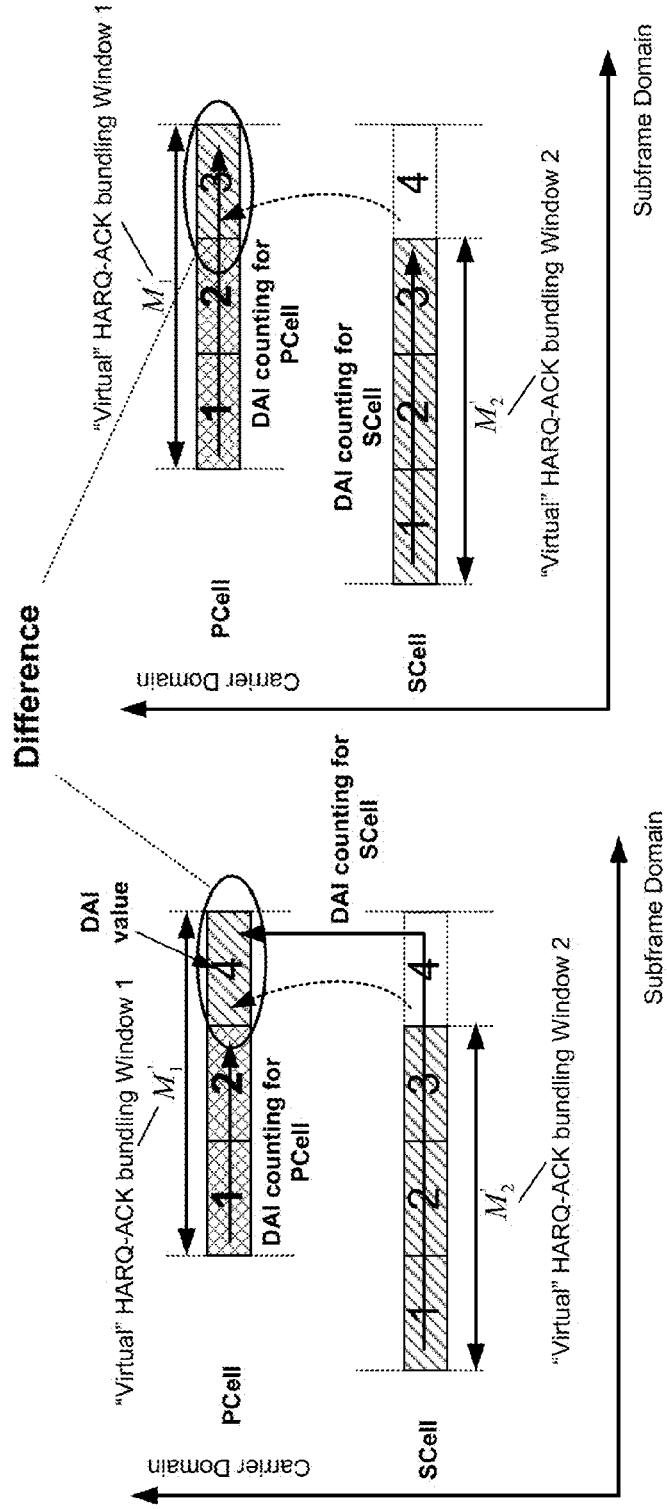
FIG. 13A illustrates a component carrier-specific (CC-specific) "virtual" bundling window generation process for hybrid automatic repeat request-acknowledgement (HARQ- ACK) mapping without downlink assignment index (DAI) redefinition (e.g., per CC DAI counting) in accordance with an example.
FIG. 13B illustrates a component carrier-specific (CC-specific) "virtual" bundling window generation process for hybrid automatic repeat request-acknowledgement (HARQ-ACK) mapping with downlink assignment index (DAI) redefinition (e.g., cross CC DAI counting) in accordance with an example.

Besides the "virtual" bundling window generation across CCs, DAI counting across the whole "virtual" bundling window "M$_1$'(i=1, 2)" in each serving cell can be beneficial in method 1 in terms of error case handling. FIGS. 13A-B provides a schematic illustration of two DAI counting methods for method 1. The two DAI counting methods, HARQ-ACK bundling window based counting (shown in FIG. 13A) and virtual bundling window based DAI counting (shown in FIG. 13B), can be compared. In the example, provided that a PDSCH transmission is scheduled on all DL subframe of virtual HARQ-ACK bundling window 1, as further elaborated in FIG. 14A, the node (e.g., eNB) may not be able to distinguish between the HARQ-ACK states "ACK, DTX, ACK" and "ACK, ACK, NACK/DTX" due to discontinuous DAI definition in each virtual bundling window. As a result, the eNB may unnecessarily retransmit the latter two DL subframes within the virtual bundling window 1. Therefore, the scheduling of three PDSCHs per virtual bundling window may not be available in eNB and DL throughput may be reduced.

Figures 14A, 14B:
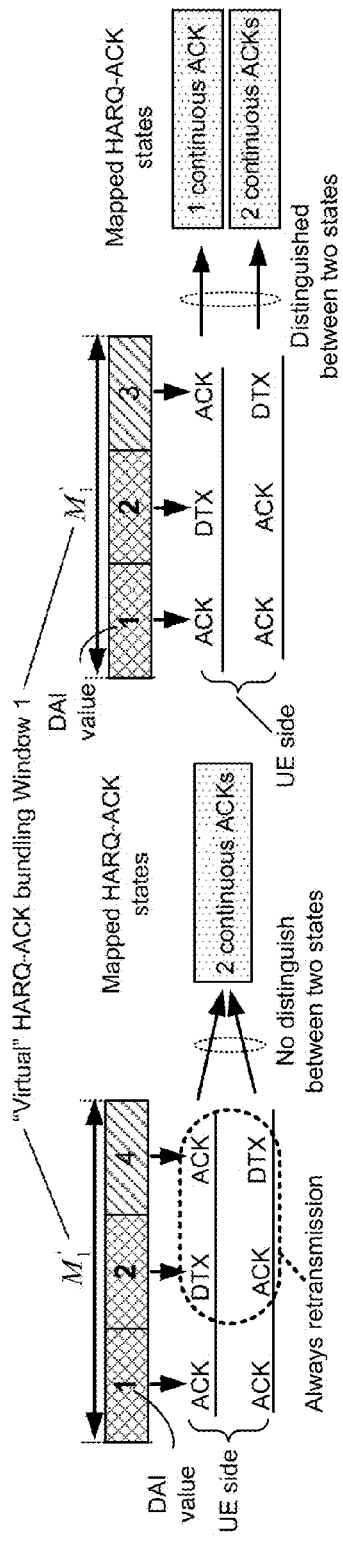
FIG. 14A illustrates error case handling without downlink assignment index (DAI) redefinition (e.g., per component carrier (CC) DAI counting) after generating a virtual bundling window in accordance with an example.
FIG. 14B illustrates error case handling with downlink assignment index (DAI) redefinition (e.g., cross component carrier (CC) DAI counting) after generating a virtual bundling window in accordance with an example.

However, in another example illustrated in FIG. 13B, two HARQ-ACK states can be distinguished based on the detection on DAI value of DL grant in each downlink subframe as shown in FIG. 14B. FIGS. 14A-B illustrates an example of error case handing with DAI redefinition after a virtual bundling window is generated. Table 8 shown in FIG. 21 and table 11 shown in FIG. 24 illustrate a legacy mapping table for a HARQ-ACK bundle size M=2.

A method 2 can define a HARQ-ACK look-up mapping table (e.g., Table 7 shown in FIG. 15) defined before reusing a legacy mapping table (e.g., LTE TS 36.213 Table 10.1.3-3 (Table 9 shown in FIG. 22), 10.1.3-4 (Table 10 shown in FIG. 23), 10.1.3-6 (Table 12 shown in FIG. 25), or 10.1.3-7 (Table 13 shown in FIG. 26)). For instance, method 2 can be used to preserve a LTE legacy one-to-one mapping between HARQ-ACK state set and the mapped PUCCH state for the serving cell with the smaller bundling window size as M$_1$≤3. A HARQ-ACK state set can be fully determined by a PDSCH detection and/or decoding status, while each mapped PUCCH state corresponding to HARQ-ACK state set can include two elements: A PUCCH channel resource, and constellation points carried on the PUCCH channel resource (i.e., PUCCH resource). As previously described, a issue can be the overlapping HARQ-ACK states mapping defined for bundling window size M=4 when more than one CC are configured. The overlapping HARQ-ACK states mapping issue can be solved by defining a look-up mapping table, as shown in Table 7 illustrated in FIG. 15. Between the two overlapped HARQ-ACK states in a legacy HARQ-ACK states mapping M=4 table (e.g., LTE TS 36.213 Table 10.1.3-4 (Table 10 shown in FIG. 23) or 10.1.3-7 (Table 13 shown in FIG. 26)), only 'NACK, any, any, any' can be selectively used for one-to-one mapping from HARQ-ACK states with bundling window size M$_1$ to a corresponding HARQ-ACK state with M$_2$. A property of Table 7 can be that HARQ-ACK states corresponding to column 1 (M1=2 case), 2 (M2=3 or M1=3) and 3 (M2=4) with a same index can share the same mapped HARQ-ACK states.

In an example, for a UE configured with PUCCH format 1b with channel selection for HARQ-ACK transmission, a method to determine the PUCCH resources can be described by the following 4-steps, as illustrated in FIG. 16:

In a step 1, the UE can select a mapping table (e.g., Tables 14-15 (FIGS. 27-28)) with M=max {M$_1$, M$_2$}=M$_2$ for HARQ feedback on PUCCH, where M$_1$ is a number of PDSCH subframes for a cell (e.g., PCell or SCell) with a smaller HARQ-ACK bundling window size and M$_2$ is a number of PDSCH subframes for a cell (e.g., SCell or PCell) with a larger HARQ-ACK bundling window size.

In a step 2, for the PDSCH on the CC with bundling window size M$_1$, a HARQ-ACK (j) can be generated as an ACK, NACK, or DTX (i.e., ACK/NACK/DTX) response for the PDSCH transmission with a corresponding PDCCH and a DAI value in the PDCCH equal to 'j+1', or for the PDCCH indicating downlink SPS release and with DAI value in the PDCCH equal to 'j+1', where 0≤j<M$_1$. Then, using a look-up table, as shown in Table 7, the UE can re-map the HARQ-ACK (j) to a corresponding state characterized with a same index sharing, marked with HARQ-ACK (k), where 0≤k<M$_1$. For example, assume that M$_1$=2, M$_2$=4 and {ACK, NACK} is generated based on PDSCH detection. Then after {ACK, NACK} is mapped, the UE re-maps the two-HARQ-ACK state to a corresponding four-HARQ-ACK state with a same index of M$_2$=4 (i.e., state {ACK, DTX, DTX, DTX}).

In a step 3, HARQ-ACK mapping for the CC with a bundling window size M$_2$ can have a same index as a legacy table and marked as HARQ-ACK (m).

In a step 4, a UE can perform channel selection based on the HARQ-ACK states HARQ-ACK (k), where 0≤k<M$_2$, and HARQ-ACK (m), where where 0≤m<M$_2$, according to a HARQ-ACK mapping table (e.g., Table 14 or 15) with bundling window size M$_2$ defined for more than one CC configured.

For example, as shown in FIG. 16, two carriers can be configured for UE, denoted as PCell and SCell where TDD Configuration 1 is deployed at the PCell and Configuration 2 is used by the SCell. In the step-1, UE determines to use M=max {M$_1$, M$_2$}=max {2, 4}=4 PUCCH mapping table (e.g., Table 15). In the step-2, under an assumption that an eNB transmits PDSCH on all DL subframes within the bundling window of the PCell and the corresponding HARQ-ACK for PCell is initially generated as {ACK, NACK}, the UE re-maps to {ACK,DTX,DTX,DTX} since both the two-HARQ-ACK state and the four-HARQ-ACK state share a same index (Index=0) in Table 7 and a M=4 mapping table can be used for PUCCH mapping in the step-1. In the step-3, the UE can generate specific HARQ-ACK states, such as {ACK, ACK, DTX, ACK}, while the eNB transmitted PDSCH on all DL subframe within bundling window of the SCell. In the step-4, the UE can transmit the constellation bits "b(0), b(1)"="0, 1" on PUCCH channel $n_{PUCCH,0}^{(1)}$ according a predefined PUCCH mapping table (e.g., Tables 14-15). At an eNB side, a reverse procedure can be implemented for PUCCH detection and PDSCH retransmission based on Table 7. With the method 2, a one-to-one HARQ-ACK mapping for the cell with small bundling window size can be used and a downlink throughput performance can be improved.

Figure 17:
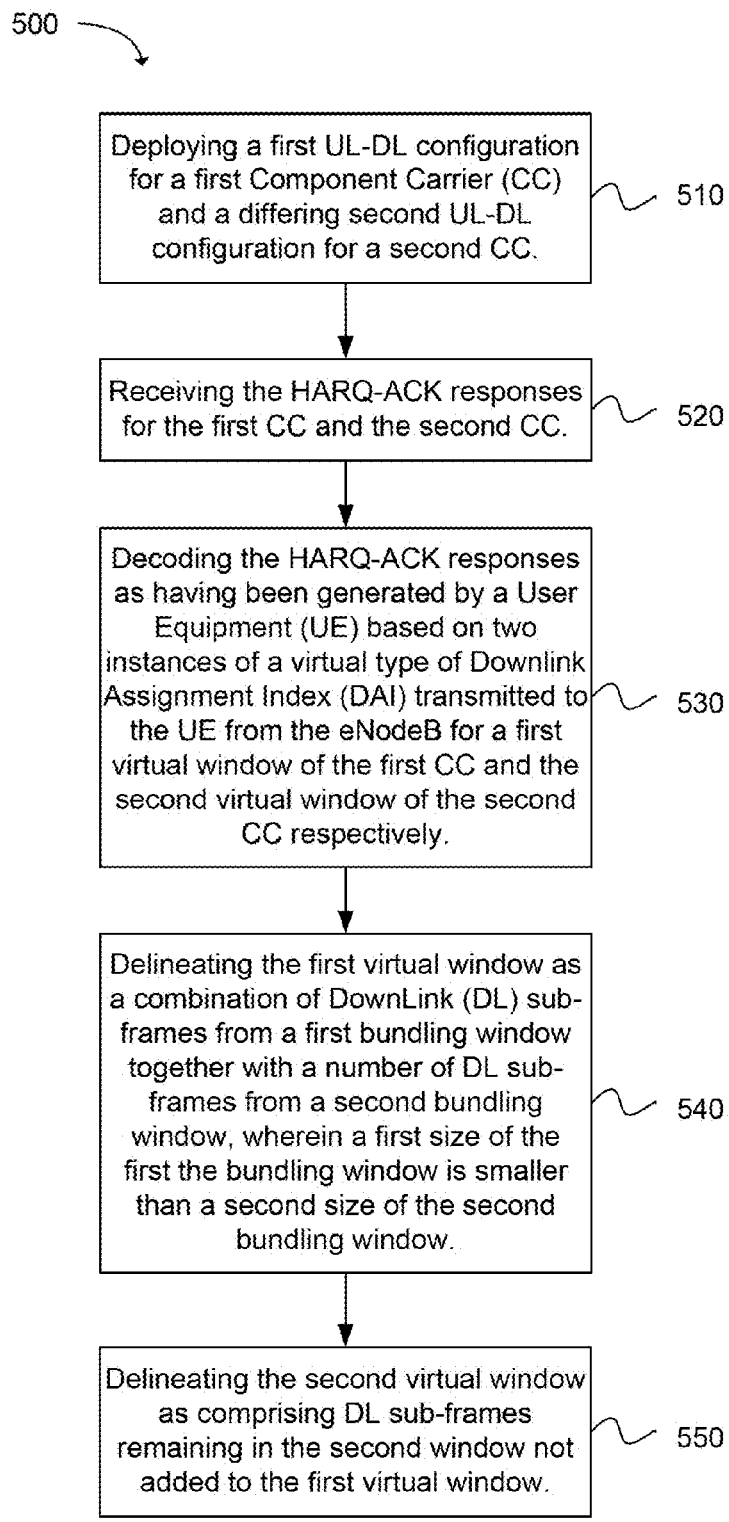
FIG. 17 depicts a flow chart of a method for interpreting Hybrid Automatic Retransmission re-Quest-ACKnowledge (HARQ-ACK) responses in accordance with an example.

Another example provides a method 500 for interpreting Hybrid Automatic Retransmission re-Quest-ACKnowledge (HARQ-ACK) responses, as shown in the flow chart in FIG. 17. The method may be executed as instructions on a machine, computer circuitry, or a processor for an evolved Node B (eNodeB), where the instructions are included on at least one computer readable medium or one non-transitory machine readable storage medium. The method includes the operation of deploying a first UL-DL configuration for a first Component Carrier (CC) and a differing second UL-DL configuration for a second CC, as in block 510. The operation of receiving the HARQ-ACK responses for the first CC and the second CC follows, as in block 520. The next operation of the method can be decoding the HARQ-ACK responses as having been generated by a User Equipment (UE) based on two instances of a virtual type of Downlink Assignment Index (DAI) transmitted to the UE from the eNodeB for a first virtual window of the first CC and the second virtual window of the second CC respectively, as in block 530. The operation of delineating the first virtual window as a combination of DownLink (DL) sub-frames from a first bundling window together with a number of DL sub-frames from a second bundling window, wherein a first size of the first the bundling window is smaller than a second size of the second bundling window follows, as in block 540. The method can further include delineating the second virtual window as comprising DL sub-frames remaining in the second window not added to the first virtual window, as in block 550.

In an example, a selected number of DL sub-frames from the second bundling window can be selected from an end of the second bundling window and added to an end of DL sub-frames in the first bundling window. The first bundling window and the second bundling window can include multiple DL sub-frame sets associated with one UpLink (UL) sub-frame to carry the HARQ-ACK feedback according to Third Generation Partnership Project (3GPP) Long Term Evolution (LTE) standard Release 10 (or Release 11) for cell-specific Physical Downlink Shared CHannel (PDSCH) HARQ timing.

In another example, the method can further include determining the number of DL sub-frames added to the first virtual window from the second traditional bundling window as an absolute difference between the first size and the second size divided by two. In another configuration, the method can further include selecting at least one DL sub-frame for at least one of the first CC and the second CC for re-transmission; and retransmitting, on a transceiver, the at least one DL sub-frame to the UE. The at least one DL sub-frame selected for retransmission can be based on the decoding of the HARQ-ACK response according to the two instances of the virtual type of DAI and delineations of the first virtual window and the second virtual window. The HARQ-ACK responses can be embedded in a Physical Uplink Control CHannel (PUCCH) format 1b message with channel selection, including a PUCCH channel resource and a constellation point. The operation of decoding the HARQ-ACK responses can further include de-mapping the channel resource and the constellation point of the format 1b message according to a legacy mapping table defined in Technical Specification (TS) 36.213 for any of Release 10 of the Third Generation Partnership Project (3GPP) Long Term Evolution (LTE) standards.

The operation of delineating the first virtual window and the second virtual window can further include: delineating one of the first bundling window and the second bundling window according to a UL-DL configuration embedded in a System Information Block 1 (SIB1) for a Primary Cell (PCell) corresponding to one of the first CC and the second CC; and delineating a remaining one of the first bundling window and the second bundling window according to a predefined UL-DL configuration indexed according the UL-DL configuration for the PCell and a UL-DL configuration embedded in an SIB1 for a Secondary Cell (SCell). In an example, the first UL-DL configuration can correspond to UL-DL configuration 1; and the second UL-DL configuration can correspond to UL-DL configuration 2.

Figure 18:
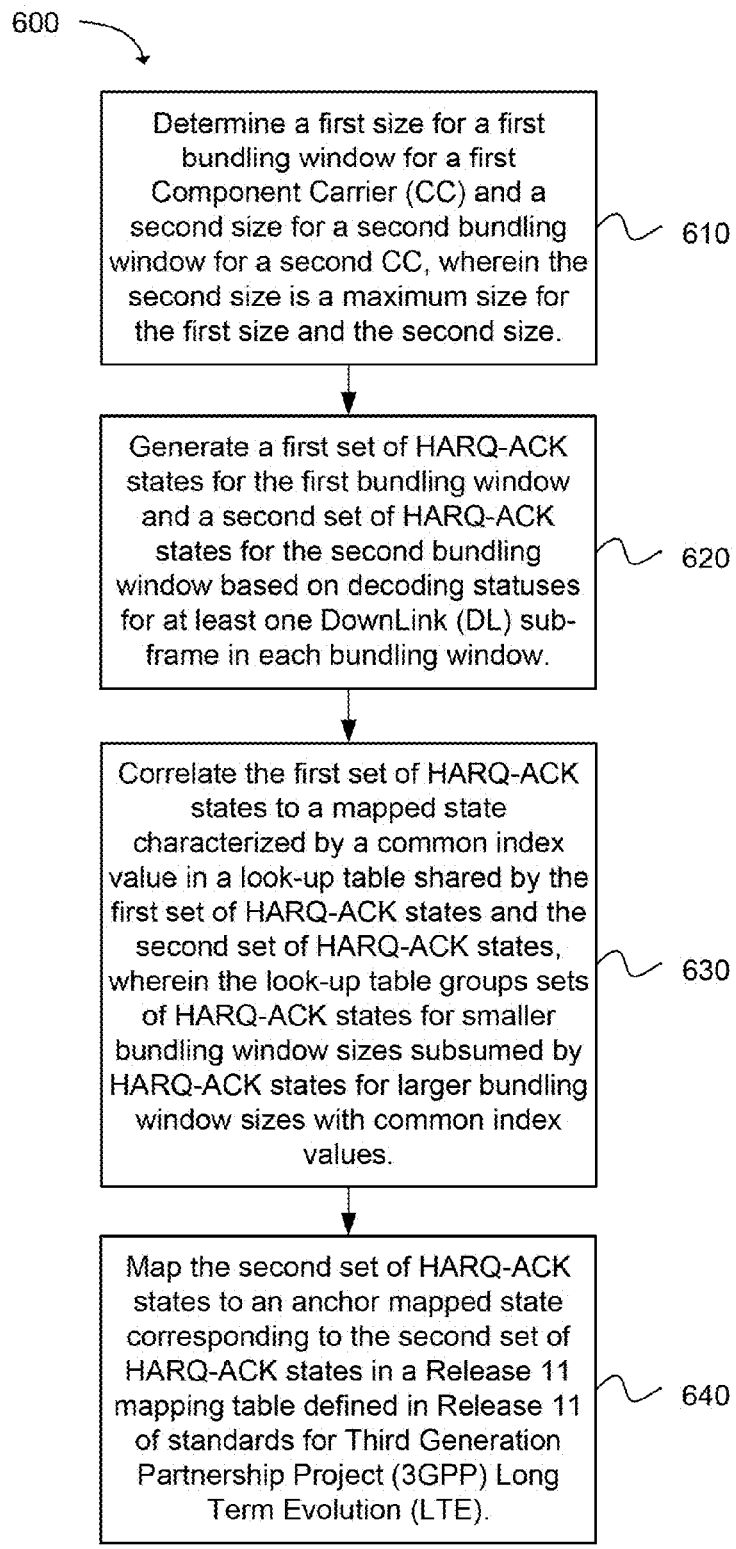
FIG. 18 depicts functionality of computer circuitry of a processor on a user equipment (UE) operable to provide Hybrid Automatic Retransmission re-Quest-ACKnowledge (HARQ-ACK) responses in accordance with an example.

Another example provides functionality 600 of computer circuitry of a processor on a user equipment (UE) operable to provide Hybrid Automatic Retransmission re-Quest-ACKnowledge (HARQ-ACK) responses, as shown in the flow chart in FIG. 18. The functionality may be implemented as a method or the functionality may be executed as instructions on a machine, where the instructions are included on at least one computer readable medium or one non-transitory machine readable storage medium. The computer circuitry can be configured to determine a first size for a first bundling window for a first Component Carrier (CC) and a second size for a second bundling window for a second CC, wherein the second size is a maximum size for the first size and the second size, as in block 610. The computer circuitry can be further configured to generate a first set of HARQ-ACK states for the first bundling window and a second set of HARQ-ACK states for the second bundling window based on decoding statuses for at least one DownLink (DL) sub-frame in each bundling window, as in block 620. The computer circuitry can also be configured to correlate the first set of HARQ-ACK states to a mapped state characterized by a common index value in a look-up table shared by the first set of HARQ-ACK states and the second set of HARQ-ACK states, wherein the look-up table groups sets of HARQ-ACK states for smaller bundling window sizes subsumed by HARQ-ACK states for larger bundling window sizes with common index values, as in block 630. The method can further include map the second set of HARQ-ACK states to an anchor mapped state corresponding to the second set of HARQ-ACK states in a mapping table defined in Release 10 of standards for Third Generation Partnership Project (3GPP) Long Term Evolution (LTE), as in block 640.

In an example, the computer circuitry can be further configured to perform channel selection, by the UE, according to the anchor mapped state indicated by the Release 10 mapping table for the second set of HARQ-ACK states to create a HARQ-ACK response for the first CC and the second CC each with the second size corresponding to a Physical Uplink Control CHannel (PUCCH) for the first bundling window and the second bundling window. The HARQ-ACK response can be embedded in a Physical Uplink Control CHannel (PUCCH) format 1b message with channel selection.

In another example, the look-up table comprises at least five rows, where each row can includes 4 elements. A first element can provide an index value. A second element can provide a set of HARQ-ACK states for a case where the first size for a first bundling window equals two. A third element can provide a set of HARQ-ACK states for a case where one of the first size for a first bundling window equals three or the second size for the second bundling window equals three. A fourth element can provide a set of HARQ-ACK states for a case where the second size for the second bundling window equals four.

In a configuration, the look-up table can include a first row and a second row. The first row can include: an index value of zero in the first element; an ordered set of HARQ-ACK states in the second element equal to ACKnowledge (ACK), and one of Negative ACK (NACK) and Discontinuous Transmission (DTX); an ordered set of HARQ-ACK states in the third element equal to ACK, and one of NACK and DTX, and ANY, wherein the HARQ-ACK state of ANY can be one of ACK, NACK, and DTX; and an ordered set of HARQ-ACK states in the fourth element equal to ACK, DTX, DTX, and DTX. The second row can include: an index value of one in the first element; an ordered set of HARQ-ACK states in the second element equal to one of ACK and DTX and ACK; an ordered set of HARQ-ACK states in the third element equal to ACK, ACK, and one of NACK and DTX; and an ordered set of HARQ-ACK states in the fourth element equal to ACK, ACK, one of NACK and DTX, and ANY.

In another configuration, the look-up table can include a third row, a fourth row, and a fifth row. The third row can include: an index value of two in the first element; an ordered set of HARQ-ACK states in the second element equal to ACK and ACK; an ordered set of HARQ-ACK states in the third element equal to ACK, ACK, and ACK; and an ordered set of HARQ-ACK states in the fourth element equal to ACK, ACK, ACK, and one of NACK and DTX. The fourth row can include: an index value of three in the first element; an ordered set of HARQ-ACK states in the second element equal to DTX and DTX; an ordered set of HARQ-ACK states in the third element equal to DTX, ANY, and ANY; and an ordered set of HARQ-ACK states in the fourth element equal to DTX, ANY, ANY, and ANY. The fifth row can include: an index value of four in the first element; an ordered set of HARQ-ACK states in the second element equal to NACK and NACK; an ordered set of HARQ-ACK states in the third element equal to one of NACK and DTX, ANY and ANY; and an ordered set of HARQ-ACK states in the fourth element equal to NACK, ANY, ANY, and ANY.

In another example, the computer circuitry can be further configured to select the legacy mapping table according to the second size for the second bundling window from: Table 10.1.3.2-5 (i.e., Table 14), where the second size for the second bundling window is equal to three; or Table 10.1.3.2-6 (i.e., Table 15), where the second size for the second bundling window is equal to four. The Table 10.1.3.2-5 and the Table 10.1.3.2-6 can be defined in Technical Specification (TS) 36.213 for any of Release 8, Release 9, Release 10, and Release 11 of the Third Generation Partnership Project (3GPP) Long Term Evolution (LTE) standards.

In another configuration, the computer circuitry configured to generate a first set of HARQ-ACK states for the first bundling window and a second set of HARQ-ACK states for the second bundling window can be further configured to: Receive a first Downlink Assignment Index (DAI) and a second DAI for the first bundling window and the second bundling window, respectively; and generate a first set of HARQ-ACK states for the first bundling window and a second set of HARQ-ACK states for the second bundling window commensurate with numbers of assigned DL sub-frames for Physical Data Shared CHannel (PDSCH) transmissions indicated by the first DAI and the second DAI, respectively.

Figure 19:
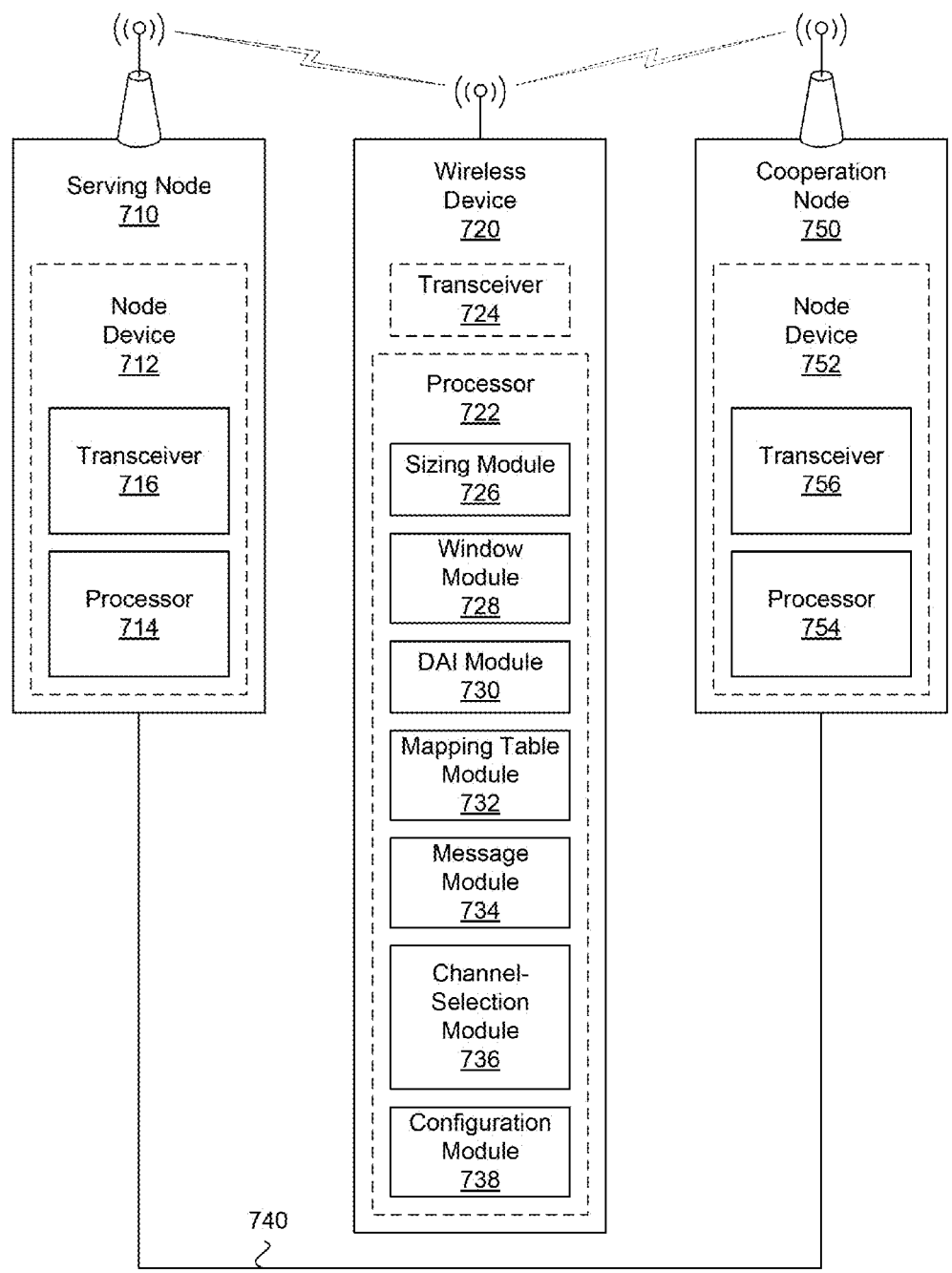
FIG. 19 illustrates a block diagram of a serving node, a coordination node, and wireless device in accordance with an example.

FIG. 19 illustrates an example node (e.g., serving node 710 and cooperation node 750) and an example wireless device 720. The node can include a node device 712 and 752. The node device or the node can be configured to communicate with the wireless device. The node device can be configured to support Hybrid Automatic Retransmission re-Quest (HARQ) for Carrier Aggregation (CA). The node device or the node can be configured to communicate with other nodes via a backhaul link 740 (optical or wired link), such as an X2 application protocol (X2AP). The node device can include a processor 714 and 754 and a transceiver 716 and 756. The transceiver can be configured to receive a HARQ-ACK feedback in a PUCCH resource. The transceiver 716 and 756 can be further configured to communicate with the coordination node via an X2 application protocol (X2AP). The processor can be further configured to a reverse procedure can be implemented for PUCCH detection and PDSCH retransmission based on Table 7 (i.e., FIG. 15). The serving node can generate both the PCell and the SCell. The node (e.g., serving node 710 and cooperation node 750) can include a base station (BS), a Node B (NB), an evolved Node B (eNB), a baseband unit (BBU), a remote radio head (RRH), a remote radio equipment (RRE), a remote radio unit (RRU), or a central processing module (CPM).

The wireless device 720 can include a transceiver 724 and a processor 722. The wireless device (i.e., device) can be configured to support Hybrid Automatic Retransmission re-Quest (HARQ) for Carrier Aggregation (CA). The processor can include a sizing module 726, a window module 728, a Downlink Assignment Index (DAI) module 730, a mapping table module 732, a message module 734, a channel-selection module 736, and a configuration module 738.

The sizing module 726 can be configured to determine a first size of a first bundling window for a first Component Carrier (CC) and a second size of a second bundling window for a second CC. The window module 728 can be configured to: Generate a first virtual window comprising a selected number of DownLink (DL) sub-frames in the first bundling window that are added to DL sub-frames in the second bundling window; and generate a second virtual window comprising remaining DL sub-frames from the first bundling window that are not added to the first virtual window. The selected number of DL sub-frames can be proportional to a difference between the first size and the second size.

In an example, the window module can be further configured to generate the first virtual window by adding the selected number of DL sub-frames from an end of the first bundling window to an end of DL sub-frames in the second bundling window. The first bundling window and the second bundling window comprise multiple DL sub-frames sets associated with one UpLink (UL) sub-frame to carry the HARQ-ACKnowledge (ACK) feedback according to Third Generation Partnership Project (3GPP) Long Term Evolution (LTE) standard Release 11 for cell-specific Physical Downlink Shared CHannel (PDSCH) HARQ timing.

In another example, the DAI module 730 can be configured to: Decode a first instance of a type of DAI as indicating DL sub-frames assigned for Physical Downlink Shared CHannel (PDSCH) transmission across the first virtual window for purposes of error case handling; and decode a second instance of the type of DAI as indicating DL sub-frames assigned for PDSCH transmission across the second virtual window also for purposes of error case handling. The mapping table module 732 can be configured to: Select at least one HARQ-ACKnowledge (ACK) mapping table based on window sizes of the first virtual window and the second virtual window; and map two Physical Uplink Control CHannel (PUCCH) resources corresponding to each virtual window associated with the first instance and the second instance of the type of DAI within each virtual window; and select a first mapped state for the first virtual window and a second mapped state for the second virtual window from the at least one mapping table, the first mapped state corresponding to a first set of HARQ-ACK states and the second mapped state corresponding to a second set of HARQ-ACK states.

In another configuration, the message module can be in communication with the transceiver and can be configured to embed the first set of HARQ-ACK states and the second set of HARQ states in a Physical Uplink Control CHannel (PUCCH) format 1b message with channel selection. The channel-selection module can be in communication with the message module and the transceiver and can be configured to perform the channel selection according the first set of HARQ-ACK states for the first virtual window and the second set of HARQ-ACK states for the second virtual window. A Primary Cell (PCell) can correspond to one of the first CC and the second CC, and a Secondary Cell (SCell) corresponds to the other of the first CC and the second CC.

In another example, the message module can be configured to: Extract an UpLink-DownLink (UL-DL) configuration from a System Information Block 1 (SIB1) transmitted on the PCell for Physical Downlink Shared CHannel (PDSCH) HARQ-ACK feedback; extract a UL-DL configuration from a SIB1 transmitted on the SCell for PDSCH HARQ-ACK feedback; and select a predefined UL-DL configuration for SCell HARQ-AC Knowledge (ACK) feedback according to the SIB1 UL-DL configuration on the PCell and a SIB1 UL-DL configuration on the SCell following a cell-specific HARQ-ACK timing relationship defined in Release 11 of Third Generation Partnership Project (3GPP) Long Term Evolution (LTE) standards.

In another configuration, the sizing module can be further configured to: Determine the first size of the first bundling window based on one of the UL-DL configuration for the PCell and the UL-DL configuration for the SCell; and determine the second size of the second bundling window based on one of the UL-DL configuration for the SCell and the UL-DL configuration for the PCell, which differs from the first bundling window.

Figure 20:
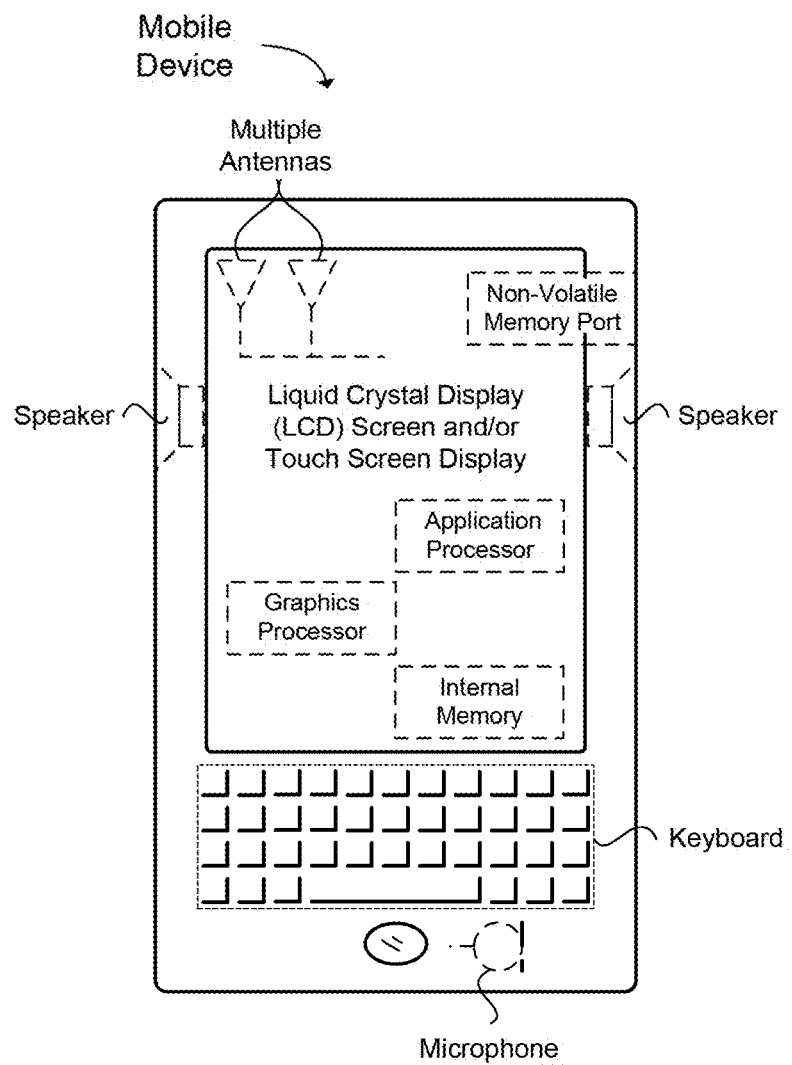
FIG. 20 illustrates a diagram of a wireless device (e.g., UE) in accordance with an example.

FIG. 20 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 20 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program (s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A device, at a processor residing on a User Equipment (UE), to support Hybrid Automatic Retransmission re-Quest (HARQ) for Carrier Aggregation (CA), comprising:
   a sizing module configured to determine a first size of a first bundling window for a first Component Carrier (CC) and a second size of a second bundling window for a second CC;
   a window module configured to:
   generate a first virtual window comprising a selected number of DownLink (DL) sub-frames in the first bundling window that are added to DL sub-frames in the second bundling window, wherein the selected number of DL sub-frames is proportional to a difference between the first size and the second size; and
   generate a second virtual window comprising remaining DL sub-frames from the first bundling window that are not added to the first virtual window.

2. The device of claim 1, wherein the window module is further configured to generate the first virtual window by adding the selected number of DL sub-frames from an end of the first bundling window to an end of DL sub-frames in the second bundling window.

3. The device of claim 1, wherein the first bundling window and the second bundling window comprise multiple DL sub-frames sets associated with one UpLink (UL) sub-frame to carry the HARQ-ACKnowledge (ACK) feedback according to Third Generation Partnership Project (3GPP) Long Term Evolution (LTE) standard Release 11 for cell-specific Physical Downlink Shared CHannel (PDSCH) HARQ timing.

4. The device of claim 1, further comprising a Downlink Assignment Index (DAI) module, at the processor, configured to:
   decode a first instance of a type of DAI as indicating DL sub-frames assigned for Physical Downlink Shared CHannel (PDSCH) transmission across the first virtual window for purposes of error case handling; and
   decode a second instance of the type of DAI as indicating DL sub-frames assigned for PDSCH transmission across the second virtual window also for purposes of error case handling.

5. The device of claim 4, further comprising a mapping table module, at the processor, configured to:
   select at least one HARQ ACKnowledge (HARQ-ACK) mapping table based on window sizes of the first virtual window and the second virtual window;
   map two Physical Uplink Control CHannel (PUCCH) resources corresponding to each virtual window associated with the first instance and the second instance of the type of DAI within each virtual window; and
   select a first mapped state for the first virtual window and a second mapped state for the second virtual window from the at least one mapping table, the first mapped state corresponding to a first set of HARQ-ACK states and the second mapped state corresponding to a second set of HARQ-ACK states.

6. The device of claim 5, further comprising a message module, at the processor and in communication with a transceiver, configured to:
   embed the first set of HARQ-ACK states and the second set of HARQ states in a Physical Uplink Control CHannel (PUCCH) format 1b message with channel selection.

7. The device of claim 6, further comprising a channel-selection module in communication with the message module, the channel-selection module at the processor in communication with a transceiver, configured to:
   perform the channel selection according the first set of HARQ-ACK states for the first virtual window and the second set of HARQ-ACK states for the second virtual window.

8. The device of claim 1, wherein:
   a Primary Cell (PCell) corresponds to one of the first CC and the second CC; and
   a Secondary Cell (SCell) corresponds to the other of the first CC and the second CC.

9. The device of claim 8, further comprising a configuration module, at the processor, configured to:
   extract an UpLink-DownLink (UL-DL) configuration from a System Information Block 1 (SIB1) transmitted on the PCell for Physical Downlink Shared CHannel (PDSCH) HARQ-ACK feedback;
   extract a UL-DL configuration from a SIB1 transmitted on the SCell for PDSCH HARQ-ACK feedback; and
   select a predefined UL-DL configuration for SCell HARQ-ACKnowledge (ACK) feedback according to the SIB1 UL-DL configuration on the PCell and a SIB1 UL-DL configuration on the SCell following a cell-specific HARQ-ACK timing relationship defined in Release 11 of Third Generation Partnership Project (3GPP) Long Term Evolution (LTE) standards.

10. The device of claim 9, wherein the sizing module is further configured to:
    determine the first size of the first bundling window based on one of the UL-DL configuration for the PCell and the UL-DL configuration for the SCell; and
    determine the second size of the second bundling window based on one of the UL-DL configuration for the SCell and the UL-DL configuration for the PCell, which differs from the first bundling window.

11. A method, at a processor for an evolved Node B (eNodeB), for interpreting Hybrid Automatic Retransmission reQuest-ACKnowledge (HARQ-ACK) responses, comprising:
deploying a first UL-DL configuration for a first Component Carrier (CC) and a differing second UL-DL configuration for a second CC;
receiving the HARQ-ACK responses for the first CC and the second CC;
decoding the HARQ-ACK responses as having been generated by a User Equipment (UE) based on two instances of a virtual type of Downlink Assignment Index (DAI) transmitted to the UE from the eNodeB for a first virtual window of the first CC and the second virtual window of the second CC respectively;
delineating the first virtual window as a combination of a selected number of DownLink (DL) sub-frames from a first bundling window together with a number of DL sub-frames from a second bundling window, wherein a first size of the first bundling window is smaller than a second size of the second bundling window, and wherein the selected number of DL sub-frames from the first bundling window is proportional to a difference between the first size and the second size; and
delineating the second virtual window as comprising DL sub-frames remaining in the second window not added to the first virtual window.

12. The method of claim 11, wherein a selected number of DL sub-frames from the second bundling window are selected from an end of the second bundling window and added to an end of DL sub-frames in the first bundling window.

13. The method of claim 11, wherein the first bundling window and the second bundling window comprise multiple DL sub-frame sets associated with one UpLink (UL) sub-frame to carry the HARQ-ACK feedback according to Third Generation Partnership Project (3GPP) Long Term Evolution (LTE) standard Release 11 for cell-specific Physical Downlink Shared CHannel (PDSCH) HARQ timing.

14. The method of claim 11, further comprising:
determining the number of DL sub-frames added to the first virtual window from the second traditional bundling window as an absolute difference between the first size and the second size divided by two.

15. The method of claim 11, further comprising:
selecting at least one DL sub-frame for at least one of the first CC and the second CC for re-transmission, wherein the at least one DL sub-frame selected for retransmission is based on the decoding of the HARQ-ACK response according to the two instances of the virtual type of DAI and delineations of the first virtual window and the second virtual window; and
retransmitting, on a transceiver, the at least one DL sub-frame to the UE.

16. The method of claim 11, wherein the HARQ-ACK responses are embedded in a Physical Uplink Control CHannel (PUCCH) format 1b message with channel selection, comprising a PUCCH channel resource and a constellation point.

17. The method of claim 16, wherein decoding the HARQ-ACK responses further comprises de-mapping the channel resource and the constellation point of the format 1b message according to a legacy mapping table defined in Technical Specification (TS) 36.213 for any of Release 10 of the Third Generation Partnership Project (3GPP) Long Term Evolution (LTE) standards.

18. The method of claim 11, wherein delineating the first virtual window and the second virtual window further comprises:
delineating one of the first bundling window and the second bundling window according to a UL-DL configuration embedded in a System Information Block 1 (SIB1) for a Primary Cell (PCell) corresponding to one of the first CC and the second CC; and
delineating a remaining one of the first bundling window and the second bundling window according to a predefined UL-DL configuration indexed according the UL-DL configuration for the PCell and a UL-DL configuration embedded in an SIB1 for a Secondary Cell (SCell).

19. The method of claim 18, wherein:
the first UL-DL configuration corresponds to UL-DL configuration 1; and
the second UL-DL configuration corresponds to UL-DL configuration 2.

20. A processor in a User Equipment (UE) operable to provide Hybrid Automatic Retransmission re-Quest-ACKnowledge (HARQ-ACK) responses, having computer circuitry configured to:
determine a first size for a first bundling window for a first Component Carrier (CC) and a second size for a second bundling window for a second CC, wherein the second size is a maximum size for the first size and the second size;
generate a first set of HARQ-ACK states for the first bundling window and a second set of HARQ-ACK states for the second bundling window based on decoding statuses for at least one DownLink (DL) sub-frame in each bundling window;
correlate the first set of HARQ-ACK states to a mapped state characterized by a common index value in a look-up table shared by the first set of HARQ-ACK states and the second set of HARQ-ACK states, wherein the look-up table groups sets of HARQ-ACK states for smaller bundling window sizes subsumed by HARQ-ACK states for larger bundling window sizes with common index values; and
map the second set of HARQ-ACK states to an anchor mapped state corresponding to the second set of HARQ-ACK states in a mapping table defined in Release 10 of standards for Third Generation Partnership Project (3GPP) Long Term Evolution (LTE).

21. The computer circuitry of claim 20, further comprising computer circuitry configured to:
perform channel selection, by the UE, according to the anchor mapped state indicated by the Release 10 mapping table for the second set of HARQ-ACK states to create a HARQ-ACK response for the first CC and the second CC each with the second size corresponding to a Physical Uplink Control CHannel (PUCCH) for the first bundling window and the second bundling window.

22. The computer circuitry of claim 21, wherein the HARQ-ACK response is embedded in a Physical Uplink Control CHannel (PUCCH) format 1b message with channel selection.

23. The computer circuitry of claim 20, wherein the look-up table comprises at least five rows, wherein each row comprises:
a first element providing an index value;
a second element providing a set of HARQ-ACK states for a case where the first size for a first bundling window equals two;

a third element providing a set of HARQ-ACK states for a case where one of the first size for a first bundling window equals three or the second size for the second bundling window equals three; and a fourth element providing a set of HARQ-ACK states for a case where the second size for the second bundling window equals four.

24. The computer circuitry of claim 23, wherein the look-up table comprises:

a first row providing: an index value of zero in the first element; an ordered set of HARQ-ACK states in the second element equal to ACKnowledge (ACK), and one of Negative ACK (NACK) and Discontinuous Transmission (DTX); an ordered set of HARQ-ACK states in the third element equal to ACK, and one of NACK and DTX, and ANY, wherein the HARQ-ACK state of ANY can be one of ACK, NACK, and DTX; and an ordered set of HARQ-ACK states in the fourth element equal to ACK, DTX, DTX, and DTX; and a second row providing: an index value of one in the first element; an ordered set of HARQ-ACK states in the second element equal to one of ACK and DTX and ACK; an ordered set of HARQ-ACK states in the third element equal to ACK, ACK, and one of NACK and DTX; and an ordered set of HARQ-ACK states in the fourth element equal to ACK, ACK, one of NACK and DTX, and ANY.

25. The computer circuitry of claim 23, wherein the look-up table comprises:

a third row providing: an index value of two in the first element; an ordered set of HARQ-ACK states in the second element equal to ACK and ACK; an ordered set of HARQ-ACK states in the third element equal to ACK, ACK, and ACK; and an ordered set of HARQ-ACK states in the fourth element equal to ACK, ACK, ACK, and one of NACK and DTX;

a fourth row providing: an index value of three in the first element; an ordered set of HARQ-ACK states in the second element equal to DTX and DTX; an ordered set of HARQ-ACK states in the third element equal to DTX, ANY, and ANY; and an ordered set of HARQ-ACK states in the fourth element equal to DTX, ANY, ANY, and ANY; and a fifth row providing: an index value of four in the first element; an ordered set of HARQ-ACK states in the second element equal to NACK and NACK; an ordered set of HARQ-ACK states in the third element equal to one of NACK and DTX, ANY and ANY; and an ordered set of HARQ-ACK states in the fourth element equal to NACK, ANY, ANY, and ANY.

26. The computer circuitry of claim 20, further comprising computer circuitry configured to select the legacy mapping table according to the second size for the second bundling window from:

Table 10.1.3.2-5, where the second size for the second bundling window is equal to three; or Table 10.1.3.2-6, where the second size for the second bundling window is equal to four, wherein Table 10.1.3.2-5 and Table 10.1.3.2-6 are defined in Technical Specification (TS) 36.213 for any of Release 8, Release 9, Release 10, and Release 11 of the Third Generation Partnership Project (3GPP) Long Term Evolution (LTE) standards.

27. The computer circuitry of claim 20, wherein the computer circuitry configured to generate a first set of HARQ-ACK states for the first bundling window and a second set of HARQ-ACK states for the second bundling window further comprises computer circuitry configured to:

receive a first Downlink Assignment Index (DAI) and a second DAI for the first bundling window and the second bundling window, respectively; and generate a first set of HARQ-ACK states for the first bundling window and a second set of HARQ-ACK states for the second bundling window commensurate with numbers of assigned DL sub-frames for Physical Data Shared CHannel (PDSCH) transmissions indicated by the first DAI and the second DAI, respectively.

* * * * *